US011244340B1

(12) United States Patent
Morin et al.

(10) Patent No.: US 11,244,340 B1
(45) Date of Patent: Feb. 8, 2022

(54) METHOD AND SYSTEM FOR USING MACHINE LEARNING TECHNIQUES TO IDENTIFY AND RECOMMEND RELEVANT OFFERS

(71) Applicant: Intuit Inc., Mountain View, CA (US)

(72) Inventors: Yao H. Morin, San Diego, CA (US); James Jennings, San Diego, CA (US); Christian A. Rodriguez, Palo Alto, CA (US); Lei Pei, Sunnyvale, CA (US); Jyotiswarup Pai Raiturkar, Bellandur (IN)

(73) Assignee: Intuit Inc., Mountain View, CA (US)

( * ) Notice: Subject to any disclaimer, the term of this patent is extended or adjusted under 35 U.S.C. 154(b) by 1058 days.

(21) Appl. No.: 15/875,202

(22) Filed: Jan. 19, 2018

(51) Int. Cl.
*G06Q 30/00* (2012.01)
*G06Q 30/02* (2012.01)
(Continued)

(52) U.S. Cl.
CPC ....... *G06Q 30/0224* (2013.01); *G06K 9/6256* (2013.01); *G06K 9/6269* (2013.01);
(Continued)

(58) Field of Classification Search
None
See application file for complete search history.

(56) References Cited

U.S. PATENT DOCUMENTS 7,565,312 B1 7/2009 Shaw et al.
7,685,144 B1 * 3/2010 Katragadda ............ G06F 40/274
707/999.101

(Continued)

FOREIGN PATENT DOCUMENTS

CN 107222875 A * 9/2017 ............. Y02D 30/70
CN 107844798 A * 3/2018 ............... G06K 9/62
(Continued)

OTHER PUBLICATIONS

John D. Kelleher et al. Solutions Manual for Fundamentals of Machine Learning for Predictive Data Analytics. (Apr. 22, 2015). Retrieved online May 20, 2021. http://machinelearningbook.com/wp-content/uploads/2015/07/FMLPDA_freely_avail_solutions.pdf (Year: 2015).*

(Continued)

*Primary Examiner* — James A Reagan
(74) *Attorney, Agent, or Firm* — Paradice and Li LLP

(57) ABSTRACT

User data from users/consumers is transformed into machine learning training data including historical offer attribute model training data, historical offer performance model training data, and user attribute model training data associated with two or more users/consumers, and, in some cases, millions, tens of millions, or hundreds of millions or more, users/consumers. The machine learning training data is then used to train one or more offer/attribute matching models in an offline training environment. A given current user's data and current offer data are then provided as input data to the offer/attribute matching models in an online runtime/execution environment to identify current offers predicted to have a threshold level of user interest. Recommendation data representing these offers is then provided to the user and the current user's actions with respect to the recommended offers is monitored and used as online training data.

6 Claims, 6 Drawing Sheets

(51) Int. Cl.
*G06K 9/62* (2022.01)
*G06N 5/04* (2006.01)
*G06N 5/02* (2006.01)
*G06N 20/00* (2019.01)

(52) U.S. Cl.
CPC .............. *G06N 5/025* (2013.01); *G06N 5/04* (2013.01); *G06N 20/00* (2019.01); *G06Q 30/0201* (2013.01); *G06Q 30/0202* (2013.01); *G06Q 30/0211* (2013.01)

(56) References Cited

U.S. PATENT DOCUMENTS

| | | | |
|---|---|---|---|
| 7,885,902 B1* | 2/2011 | Shoemaker | G06Q 10/10 705/319 |
| 8,942,999 B1 | 1/2015 | Fernando et al. | |
| 9,135,300 B1 | 9/2015 | Yang et al. | |
| 9,785,534 B1 | 10/2017 | Paulus et al. | |
| 9,930,102 B1 | 3/2018 | Paulus et al. | |
| 10,706,453 B1* | 7/2020 | Morin | G06N 20/20 |
| 2005/0257148 A1* | 11/2005 | Goodman | G06F 40/174 715/226 |
| 2010/0169245 A1* | 7/2010 | Basel | G06N 20/00 706/12 |
| 2011/0029862 A1* | 2/2011 | Scott | G06F 3/0237 715/261 |
| 2011/0264569 A1 | 10/2011 | Houseworth et al. | |
| 2013/0024185 A1* | 1/2013 | Parikh | G06F 3/0237 704/9 |
| 2013/0198047 A1 | 8/2013 | Houseworth et al. | |
| 2013/0290339 A1 | 10/2013 | LuVogt et al. | |
| 2014/0258828 A1* | 9/2014 | Lymer | G06F 40/174 715/224 |
| 2014/0324856 A1* | 10/2014 | Lahiani | G06Q 30/0631 707/736 |
| 2016/0148322 A1 | 5/2016 | Mascaro et al. | |
| 2017/0083963 A1 | 3/2017 | Agarwal | |
| 2018/0053120 A1* | 2/2018 | Mukherjee | G06Q 40/123 |
| 2018/0165758 A1* | 6/2018 | Saxena | G06Q 30/02 |
| 2018/0189827 A1* | 7/2018 | Ketchpaw | G06Q 30/0254 |
| 2018/0211270 A1* | 7/2018 | Wu | G06Q 30/0204 |
| 2020/0327604 A1* | 10/2020 | Morin | G06N 5/003 |

FOREIGN PATENT DOCUMENTS

| | | | | |
|---|---|---|---|---|
| KR | 101739538 B1 * | 5/2017 | ............. | G06F 17/27 |
| WO | WO-2016084336 A1 * | 6/2016 | ............. | G06N 99/00 |

OTHER PUBLICATIONS

McKinsey and Company. Marketing & Sales Big Data, Analytics, and the Future of Marketing & Sales. (Mar. 2015). Retrieved online May 20, 2021. https://www.mckinsey.com/~/media/McKinsey/Business%20Functions/Marketing%20and%20Sales/Our%20Insights/EBook%20Big%20data%20analytics%20and%20the%20future%20of (Year: 2015).*

* cited by examiner

| USER ATTRIBUTE MODEL TRAINING DATA 143 | | | HISTORICAL OFFER ATTRIBUTE MODEL TRAINING DATA 153 | | | USER USAGE 315 |
|---|---|---|---|---|---|---|
| User ID | User Age Group | User Credit Score Band | Institution | Type | Rewards | (0 or 1) |
| 20910 | 15-24 | Good | Wells Fargo | CC | Miles | 1 |
| 20910 | 15-24 | Good | Chase | CC | Points | 0 |
| 29384 | 55+ | High | Wells Fargo | Checking | Cash | 1 |
| 20933 | 25-34 | Good | Amex | CC | Miles | 1 |
| 30999 | 25-34 | Good | Amex | CC | Miles | 0 |
| 37280 | 55+ | High | Discover | CC | Cash | 1 |

FIG. 3

METHOD AND SYSTEM FOR USING MACHINE LEARNING TECHNIQUES TO IDENTIFY AND RECOMMEND RELEVANT OFFERS

CROSS-REFERENCE TO RELATED APPLICATIONS

The present application is related to U.S. patent application Ser. No. 15/866,005 titled "METHOD AND SYSTEM FOR USING MACHINE LEARNING TECHNIQUES TO MAKE HIGHLY RELEVANT AND DE-DUPLICATED OFFER RECOMMENDATIONS", filed on Jan. 9, 2018 in the name of the Inventors Yao H. Morin, James Jennings, Christian A. Rodriguez, Lei Pei, Jyotiswarup Pai Raiturkar, which is incorporated herein by reference in its entirety.

BACKGROUND

The development and widespread acceptance of electronic media, the Internet, and various other methods of electronic communication have made it significantly easier for providers of products and services to disseminate offers related to their products and services to a wide range of potential customers. However, one problem that has arisen, partly due to the relatively low cost, ease, and potential effectiveness, of distributing offers via systems such as the Internet, is that the average consumer is now so inundated with often irrelevant product and service offers that the offers have become background noise. Consequently, using current methods, product and service offers are often largely, if not entirely, ignored by the potential customers. This is clearly not a desirable situation for the distributors/providers of the offers. However, the situation is also far from ideal for the consumers given that many offers that are desirable and valuable to a given consumer are lost or ignored in the blizzard of irrelevant offers a typical consumer is subjected to on an almost daily basis.

In addition, due to the fact that many widely distributed offers are not relevant to a given consumer, a growing number of consumers not only ignore offers presented to them, but find the seemingly endless presentation of offers a significant annoyance in their life. Many offers are electronic media based offers provided to consumers through the Internet, and third-party platforms such as search engines, webpages, software applications and systems, and various other electronic media based platforms. In these instances, the annoyance of a consumer is potentially even more problematic since it is highly likely that the consumer will become equally annoyed, if not more annoyed, with the platform through which offers are being presented.

The situation above is true for all forms of offers. However, there are particular nuisances to the issue when the offers are related to financial products and/or services, such as, for example, credit cards and other financial accounts or services that lend themselves to, and often require, a response from the party receiving the offer within a relatively short time window.

One nuisance is that multiple, and virtually identical, or at least very similar, offers can be made an annoyingly large number of times to a given consumer as the response time for each similar, or identical, offer expires. In many cases, these offers not only become an annoyance to the receiver, but actually become a regularly scheduled annoyance. Once again, this is clearly not a desirable situation for either the offer provider or the offer receiver.

In addition, when the offers are related to financial products or services such as credit cards or other credit accounts, if a potential provider of the credit account disseminates offers to consumers in a more or less blanket manner, it is quite possible that the receiver of the offer does not even qualify for the credit account, has one or more similar credit accounts already, in some cases with the provider of the current offer, is not interested in the types of rewards or terms associated with the credit account being offered, or that the credit account offer is otherwise irrelevant or redundant with respect to a given consumer. When this is the case, there is a very high probability that the consumer will come to consider the offer as a waste of their time, or even an insult. This, in turn, results in a very high probability that the consumer will become annoyed with not only the offer itself, but also the provider of the product and service. The negative impression left by such an experience can remain in the mind of the consumer and cost the provider both present customers and future sales. Clearly this is the opposite of the effect desired.

As discussed above, there is a long-standing technical need in the marketing and offer distribution arts, and particularly in the financial product or service field, for a technical solution to the technical problem of only recommending offers to consumers that are relevant to the individual consumers, and are likely to be accepted by the consumers, in terms of the interest level of the consumers, the qualifications of the consumers, and the needs of the consumers. In addition, the introduction of the Internet as a platform for the distribution of electronic media based offers has made the need for a technical solution to the problem an even more immediate and pressing issue.

SUMMARY

Embodiments of the present disclosure use big data analysis methods to transform the user data from two or more users/consumers, and, in various embodiments, millions, tens of millions, or hundreds of millions or more, users/consumers, into machine learning training data including historical offer attribute model training data associated with two or more historical offers, and in various embodiments, millions, tens of millions, or hundreds of millions or more, historical offers, and historical offer performance model training data associated with each of the historical offers, that is correlated to user attribute model training data associated with each of the two or more users/consumers, and, in various embodiments, the millions, tens of millions, or hundreds of millions or more, users/consumers represented to whom the historical offers were made.

In one embodiment, the machine learning training data is then used to train one or more offer/attribute matching models and generate one or more user interest prediction algorithms in an offline training environment.

In one embodiment, a given current user's data and current offer data are then obtained and provided as input data to the one or more user interest prediction algorithms in a runtime execution environment. In one embodiment, the one or more user interest prediction algorithms generate user interest prediction data indicating the predicted level of interest the user will have in the offers represented in the current offer data.

In one embodiment, portions of current offer data representing current offers predicted to have a threshold level of user interest is transformed into recommended offer data that includes the current offers having the threshold level of current user's interest. In one embodiment, the recommended offer data is then provided to the user.

In one embodiment, the current user's actions with respect to the recommended offers is then monitored and recorded as current offer performance data. In one embodiment, portions of the current offer recommendation data, the current user's data, and the current offer performance data are then used as online training data for the one or more user interest prediction algorithms of the one or more offer/attribute matching models.

Consequently, using the disclosed embodiments, one or more offer/attribute matching models are trained in an offline environment using, in one embodiment, big data methods and training data from millions of users and offers, executed in an online environment using a given current user's data, and then further trained and improved in the online environment using real-time results data so that the one or more offer/attribute matching models, and the disclosed methods and systems for using machine learning techniques to identify and recommend relevant offers, are self-correcting and dynamically adjustable to changes in the real world, and in relative real time. The result is a technical solution to the technical problem of only recommending offers to consumers that are relevant to the individual consumers, and are likely to be accepted by the consumers, in terms of the interest level of the consumers, the qualifications of the consumers, and the needs of the consumers.

BRIEF DESCRIPTION OF THE DRAWINGS

FIG. 3 is an illustrative example of a machine learning data structure for training a user/offer attribute matching model of a rule generation module, in accordance with one embodiment;

Figure 1:
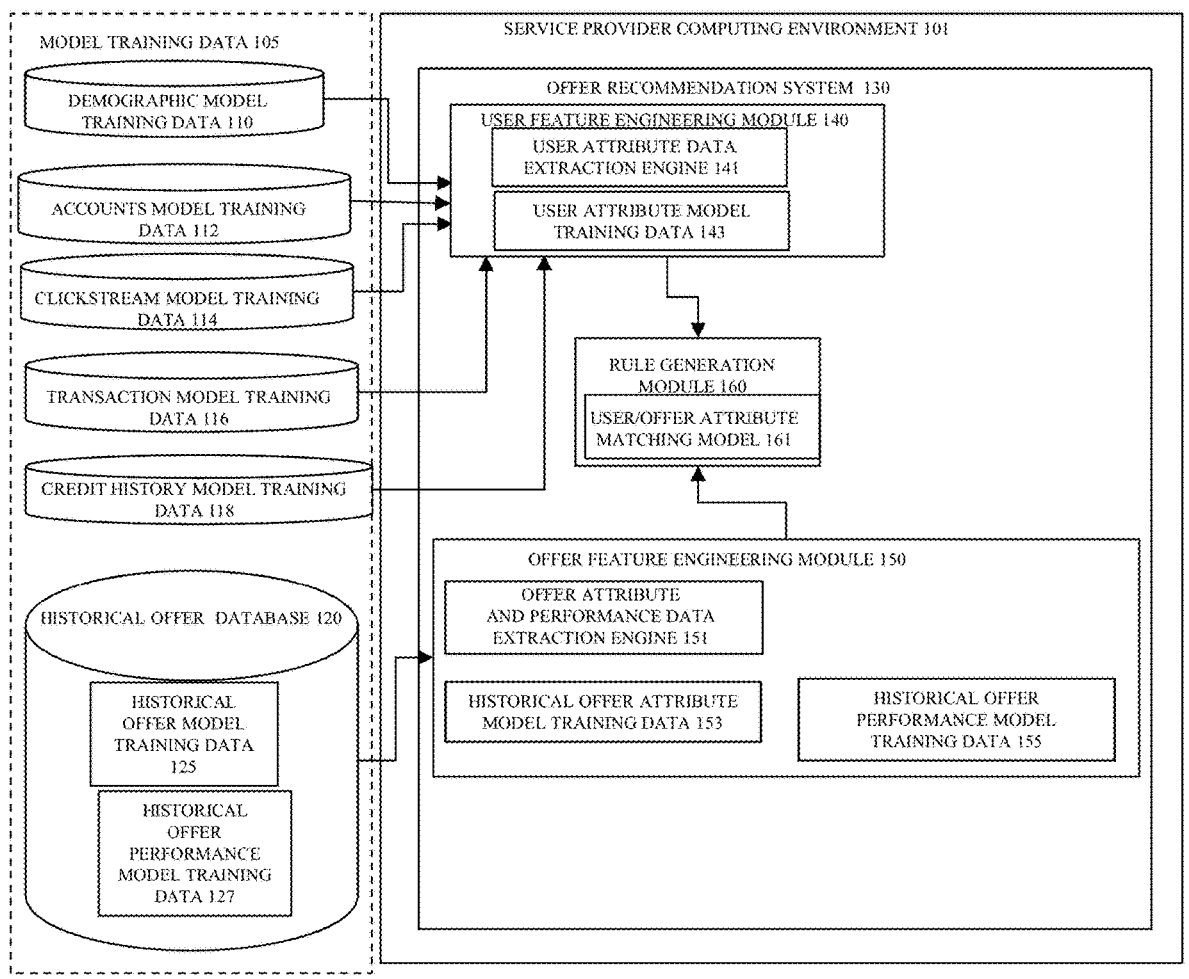
FIG. 1 is a functional block diagram of a training environment for implementing offline model training of a method and system for using machine learning techniques to identify and recommend relevant offers, in accordance with one embodiment.

Common reference numerals are used throughout the FIG.s and the detailed description to indicate like elements. One skilled in the art will readily recognize that the above FIG.s are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

Herein, a data management system can be, but is not limited to, any system or application implemented on a computing system, accessed through one or more servers, accessed through a network, accessed through a cloud, and/or provided through any system or by any means, as discussed herein, and/or as known in the art at the time of filing, and/or as developed after the time of filing, that gathers data from one or more sources and/or has the capability to analyze and categorize at least part of the data.

Herein, a financial management system can be, but is not limited to, any data management system implemented on a computing system, accessed through one or more servers, accessed through a network, accessed through a cloud, and/or provided through any system or by any means, as discussed herein, and/or as known in the art at the time of filing, and/or as developed after the time of filing, that gathers financial data, including financial transactional data, from one or more sources and/or has the capability to analyze and categorize at least part of the financial data.

As used herein, the term financial management system includes, but is not limited to the following: computing system implemented, and/or online, and/or web-based, personal and/or business financial management systems, services, packages, programs, modules, or applications; computing system implemented, and/or online, and/or web-based, personal and/or business tax preparation systems, services, packages, programs, modules, or applications; computing system implemented, and/or online, and/or web-based, personal and/or business accounting and/or invoicing systems, services, packages, programs, modules, or applications; and various other personal and/or business electronic data management systems, services, packages, programs, modules, or applications, whether known at the time of filling or as developed later.

Specific examples of financial management systems include, but are not limited to the following: QuickBooks™, available from Intuit, Inc. of Mountain View, Calif.; QuickBooks Online™, available from Intuit, Inc. of Mountain View, Calif.; QuickBooks Self-Employed available from Intuit, Inc. of Mountain View, Calif.; Mint™, available from Intuit, Inc. of Mountain View, Calif.; Mint Online™, available from Intuit, Inc. of Mountain View, Calif.; TurboTax™ available from Intuit, Inc. of Mountain View, Calif., and/or various other financial management systems discussed herein, and/or known to those of skill in the art at the time of filing, and/or as developed after the time of filing.

As used herein, the terms "computing system," "computing device," and "computing entity," include, but are not limited to, the following: a server computing system; a workstation; a desktop computing system; a mobile computing system, including, but not limited to, smart phones, portable devices, and/or devices worn or carried by a user; a database system or storage cluster; a virtual asset; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms "computing system" and "computing entity," can denote, but are not limited to, the following: systems made up of multiple virtual assets, server computing systems, workstations, desktop computing systems, mobile computing systems, database systems or storage clusters, switching systems, routers, hardware systems, communications systems, proxy systems, gateway systems, firewall systems, load balancing systems, or any devices that can be used to perform the processes and/or operations as described herein.

Herein, the terms "mobile computing system" and "mobile device" are used interchangeably and include, but are not limited to the following: a smart phone; a cellular phone; a digital wireless telephone; a tablet computing system; a notebook computing system; any portable computing system; a two-way pager; a Personal Digital Assistant (PDA); a media player; an Internet appliance; devices worn or carried by a user; or any other movable/mobile device and/or computing system that includes components that can execute all, or part, of any one of the processes and/or operations as described herein.

Herein, the term "production environment" includes the various components, or assets, used to deploy, implement, access, and use, a given application as that application is intended to be used. In various embodiments, production environments include multiple computing systems and/or assets that are combined, communicatively coupled, virtually and/or physically connected, and/or associated with one another, to provide the production environment implementing the application.

As specific illustrative examples, the assets making up a given production environment can include, but are not limited to, the following: one or more computing environments used to implement the application in the production environment such as a data center, a cloud computing environment, a dedicated hosting environment, and/or one or more other computing environments in which one or more assets used by the application in the production environment are implemented; one or more computing systems or computing entities used to implement the application in the production environment; one or more virtual assets used to implement the application in the production environment; one or more supervisory or control systems, such as hypervisors, or other monitoring and management systems used to monitor and control assets and/or components of the production environment; one or more communications channels for sending and receiving data used to implement the application in the production environment; one or more access control systems for limiting access to various components of the production environment, such as firewalls and gateways; one or more traffic and/or routing systems used to direct, control, and/or buffer data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement the application in the production environment; one or more databases used to store data in the production environment; one or more internal or external services used to implement the application in the production environment; one or more backend systems, such as backend servers or other hardware used to process data and implement the application in the production environment; one or more software systems used to implement the application in the production environment; and/or any other assets/components making up an actual production environment in which an application is deployed, implemented, accessed, and run, e.g., operated, as discussed herein, and/or as known in the art at the time of filing, and/or as developed after the time of filing.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. The hardware systems may employ processing logic that includes one or more processors, microprocessors, multi-core processors, and/or Field Programmable Gate Arrays (FPGAs) to execute operations disclosed herein. One or more memory (volatile and/or non-volatile) may be communicatively coupled to the processing logic to store instructions to execute operations and/or store data. Typically, computing environments are either known, "trusted" environments or unknown, "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate an application.

In various embodiments, one or more cloud computing environments are used to create, and/or deploy, and/or operate an application that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given application or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, the following: virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing can be implemented as one or more virtual assets.

In one embodiment, two or more assets, such as computing systems and/or virtual assets, and/or two or more computing environments are connected by one or more communications channels including but not limited to, Secure Sockets Layer (SSL) communications channels and various other secure communications channels, and/or distributed computing system networks, such as, but not limited to the following: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, the following: a peer-to-peer network; a hybrid peer-to-peer network; a Local Area Network (LAN); a Wide Area Network (WAN); a public network, such as the Internet; a private network; a cellular network; any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the terms "user," "user/consumer," and "consumer" are used interchangeably and include, but are not limited to, any party, parties, entity, or entities receiving offers and/or using, or otherwise interacting with any of the methods or systems discussed herein. For instance, in various embodiments, a user can be, but is not limited to, a person, a commercial entity, an application, a service, or a computing system.

As used herein, the term "user experience" includes not only the data entry process, but also other user experience features provided or displayed to the user such as, but not limited to the following: interfaces; images; backgrounds; avatars; highlighting mechanisms; icons; and any other features that individually, or in combination, create a user experience, as discussed herein, and/or as known in the art at the time of filing, and/or as developed after the time of filing.

Herein the term "Artificial Intelligence (AI)" includes any method, process, system, or mechanism through which a machine interacts with the world around it, mimics human behavior, or perform tasks as if it were human, using software and/or hardware components.

Herein the term "Machine Learning (ML)" includes any form of AI that relies on "learning" and uses one or more algorithms to analyze data, recognize patterns among the data, and make predictions without requiring a person to program specific instructions into software.

Herein, the term "model" includes any system, module, or function that is trained using machine learning or other artificial intelligence methods, as discussed herein, and/or as known in the art at the time of filing, and/or as developed after the time of filing.

Herein, the term "engine" includes any system, module, or process that drives a function such as identification, extraction, mapping, correlation, or any other operation that does not necessarily, but can, require machine learning methods. In some instances, the terms "model" and "engine" are interchangeable.

Overview

Embodiments of the present disclosure use big data analysis and machine learning methods to provide offer recommendations to users that are determined to be relevant to a given user. In one embodiment, machine learning based matching of user attributes and offer attributes is performed to identify potentially relevant offers for a given user.

Using the disclosed embodiments, one or more offer/attribute matching models are trained in an offline environment using, in one embodiment, big data methods and training data from millions of users and offers, executed in an online environment using real time user data, and then further trained and improved in the online environment using real-time results data so that the one or more offer/attribute matching models, and disclosed methods and systems for using machine learning techniques to identify and recommend relevant offers, are self-correcting and dynamically/automatically adjust to changes in the real world, and in relative real time. The result is a technical solution to the technical problem of only recommending offers to consumers that are relevant to the individual consumers, are likely to be accepted by the consumers, in terms of the interest level of the consumers, the qualifications of the consumers, and/or the needs of the consumers.

Thus, the disclosed embodiments make an important contribution to the fields of marketing, offer distribution, data management systems and user experience because, as a specific illustrative example, many software applications and systems, such as data management systems, are used as platforms for the provider of the software applications and systems, or third parties, to disseminate offers associated with the subject matter and/or services provided by the software application and systems. In some cases, this arrangement makes sense given the fact that the offers are typically at least tangentially related to the subject matter of the software applications and systems. However, it is equally true that if a user, and particularly a paying customer/user, of the platform software application or system becomes annoyed with offers being provided through the software application or system, the user is likely to blame the software application or system provider. In some cases, this can lead to the annoyed user abandoning the platform software application or system, or at least becoming a less satisfied customer. Consequently, it is critical for user satisfaction and delight that offers provided to a user of a software application or system actually be of interest, and relevant, to the user.

As one specific illustrative example, in one embodiment, the financial service and product offers are "quick action" offers related to financial services and products, such as, but not limited to, credit cards and/or lines of credit, or any other financial service or product offers, as discussed herein, and/or as known in the art at the time of filing, and/or as developed after the time of filing. As used herein the term "quick action offers" includes offers that lend themselves to, or impose, a relatively short response time, or that are likely to be acted upon by the offer receiver in a relatively short timeframe. In many cases, the offer receiver's response or interaction with the quick action offers are not only conducted within a relatively short time of the offer being made, but the current user's acceptance of the offer, and the offer provider's acceptance of the current user's acceptance of the offer, i.e., the performance of the offer, can be monitored and determined in a relatively short timeframe. As discussed below, this, in turn, allows for relative real-time re-training and automatic adjustment of the one or more offer/attribute matching models, and disclosed methods and systems for using machine learning techniques to identify and recommend relevant offers to changes in the real world operating environment.

In this one illustrative example, it may well be desirable to make the users of a financial management system aware of financial services and product offers, including quick response offers, though, or in association with, the financial management system used by the users, such as any of the financial management systems discussed herein, and/or as known in the art at the time of filing, and/or as developed after the time of filing. This is because providers of financial management systems often desire to provide their users a wide range of services and features customized to the current user's particular financial situation. This, in turn, provides for loyal and satisfied customer/users of the financial management systems. One way a provider of a financial management system can provide customized and relevant service to a user is to recommend the objectively, and/or subjectively, best and most personalized financial service and product related offers to the user of the financial management system; in one embodiment, through the financial management system.

However, as discussed above, there is an inherent risk to the provider of the financial management system when using their financial management system as a platform to disseminate financial service and product related offers, even when the offers are directly related to the subject matter and/or services provided by the financial management system. This is because while it arguably makes sense to provide financial service and product offers that are related to the subject matter of the financial management system, it is equally true that if a user, and particularly a paying user, of the platform financial management system becomes annoyed with offers being provided through the financial management system, the user is likely to blame the financial management system provider. In some cases, this can lead to the annoyed user abandoning the financial management system, or at least becoming a less satisfied user. Consequently, it is critical that offers provided to a user of a financial management system, through that financial management system, actually be of interest, of value, and relevant, to the user. Thus, while the embodiments disclosed herein are applicable to all forms of offers, providers of financial management systems, financial management system users, and providers of financial services and product related offers, including quick action offers, are particularly likely to significantly benefit from the implementation of the embodiments disclosed herein.

In accordance with one embodiment, the method and system for using machine learning techniques to identify and recommend relevant offers uses one or more offer/attribute matching models. In one embodiment, the one or more offer/attribute matching models are trained using one or more machine leaning techniques to generate one or more user interest prediction algorithms. To this end, in one embodiment, model training data is generated and used to train the one or more offer/attribute matching models in an offline training environment.

In one embodiment, big data analysis methods are used to access and process raw user data from multiple sources, including, but not limited to, one or more of demographic data, accounts data, clickstream data, transaction data, credit history data, historical offer data, and historical offer performance data. In one embodiment, the raw user data is obtained from one or more data management systems and is associated with two or more users/consumers of the data management systems. In various embodiments, the two or more users/consumers of the data management systems include millions, tens of millions, or hundreds of millions or more, users/consumers.

In one embodiment, the raw user data is processed and labeled to transform the raw user data into user model training data including, but not limited to, one or more of demographic model training data, accounts model training data, clickstream model training data, transaction model training data, credit history model training data, historical offer model training data, and historical offer performance model training data, associated with two or more users/consumers, and, in various embodiments, millions, tens of millions, or hundreds of millions or more, users/consumers and/or historical offers made to those user/consumers.

In one embodiment, the demographic model training data, accounts model training data, clickstream model training data, transaction model training data, and credit history model training data portions of the user model training data are analyzed and processed to identify user attributes in the user model training data and generate user attribute model training data associated with each of the two or more users/consumers, and, in various embodiments, the millions, tens of millions, or hundreds of millions or more, users/consumers represented in the user model training data.

In one embodiment, the historical offers represented in the historical offer model training data of the user model training data are correlated to the respective users represented in the user model training data to whom the historical offers were made. In one embodiment, the historical offer model training data is analyzed and processed to identify historical offer attributes and generate historical offer attribute model training data associated with the historical offers represented in the historical offer model training data. Consequently, in various embodiments, the historical offer attribute model training data includes historical offer attribute data associated with two or more historical offers and users, and, in various embodiments, millions, tens of millions, or hundreds of millions or more, historical offers and users/consumers.

In one embodiment, the historical offer attribute model training data associated with each historical offer is then correlated to the respective users represented in the user model training data to whom the historical offers were made and the user attribute model training data associated with the respective users represented in the user model training data to whom the historical offers were made. In addition, in one embodiment, the offers represented in the historical offer model training data are correlated with their respective historical offer performance model training data. Consequently, in one embodiment, historical offer attribute model training data associated with two or more historical offers, and in various embodiments, millions, tens of millions, or hundreds of millions or more, historical offers, and the historical offer performance model training data associated with each of the historical offers, is correlated to user attribute model training data associated with each of the two or more users/consumers, and, in various embodiments, the millions, tens of millions, or hundreds of millions or more, users/consumers to whom the historical offers were made.

In one embodiment, the correlated user attribute training data, historical offer attribute training data, and the historical offer performance model training data associated with the two or more users/consumers and historical offers, and, in various embodiments, the millions, tens of millions, or hundreds of millions or more, users/consumers and historical offers is then provided as training data for one or more offer/attribute matching models. In one embodiment, the one or more offer/attribute matching models use the correlated user attribute training data, historical offer attribute training data, and the historical offer performance model training data in an offline training environment to generate one or more user interest prediction algorithms for matching offers to users/consumers and predicting a level of interest in an offer by a given user/consumer.

In one embodiment, once the one or more offer/attribute matching models are trained using the correlated user attribute training data, the historical offer attribute training data, and the historical offer performance model training data in an offline training environment, the method and system for using machine learning techniques to identify and recommend relevant offers is ready for execution in an online/runtime environment.

In one embodiment, runtime execution of the method and system for using machine learning techniques to identify and recommend relevant offers is performed using a current user's data, i.e., a given user currently being processed by the method and system for using machine learning techniques to identify and recommend relevant offers. To this end, in one embodiment, a current user's data representing data associated with the given current user is obtained from one or more sources of the given current user's data. In one embodiment, a given current user's data includes, but is not limited to, one or more of demographic data associated with the given current user, accounts data associated with the given current user, clickstream data associated with the given current user, transaction data associated with the given current user, and credit history data associated with the given current user.

In one embodiment, a current user's data, such as the current user's demographic data, the current user's accounts data, the current user's clickstream data, the current user's transaction data, and the current user's credit history data are analyzed and processed to identify the current user's attributes in the current user's data and generate current user attribute data associated with the current user.

In one embodiment, current offer data representing one or more current offers associated with one or more products is obtained, in one embodiment from one or more product and/or service providers and/or a current offer database.

As noted above, in one specific embodiment, the current offer data includes one or more financial service and product offers that are "quick action" offers related to financial services and products, such as, but not limited to, credit cards and/or lines of credit, or any other financial service or product offers, as discussed herein, and/or as known in the art at the time of filing, and/or as developed after the time of filing, that lend themselves to, or impose, a relatively short response time, or that are likely to be acted upon by the offer receiver in a relatively short timeframe.

In one embodiment, the current offer data is accessed and processed to identify and generate current offer attribute data representing various current offer attributes associated with each current offer represented in the current offer data. In one embodiment, the current offer attribute data associated with each current offer in the current offer data is correlated to the current offer.

In one embodiment, the current user's attribute data and the current offer attribute data are provided as input data to the one or more user interest prediction algorithms of the one or more offer/attribute matching models. In one embodiment, the one or more user interest prediction algorithms of the one or more offer/attribute matching models use the current user's attribute data and the current offer attribute data to generate user interest prediction data indicating the predicted level of interest of the user for each of the current offers in the current offer data.

In one embodiment, the portion of current offer data representing one or more current offers having a threshold current user's interest level as indicated in the user interest prediction data for the current offers is transformed into recommended offer data that includes the portions of the current offer data representing the one or more current offers having a threshold current user's interest level. In one embodiment, the recommended offer data is then provided to the user.

In one embodiment, the recommended offers for the user are ranked in the offer recommendation data according to various factors including, but not limited to, the weighted or non-weighted matching level of the user and offer attributes, and/or any other indicated parameters. In one embodiment, the analysis parameters, features, assumptions, and/or processes used to perform the ranking of the recommended offers, including the predicted level of interest data, is included in the offer recommendation data provided to the user. In one embodiment, the offer recommendation data includes a score or ranking indicating the likelihood of the user successfully obtaining the product or service that is the subject of the recommended offers and, in one embodiment, key factors and considerations used in the calculations.

In one embodiment, the current user's actions with respect to the recommended offer of the recommended offer data is monitored and recorded as current offer performance data. In one embodiment, an offer tracking module is used to monitor the current user's actions with respect to the recommended offers of the offer recommendation data. In one embodiment, the current user's actions with respect to the recommended offers is recorded and used to generate current offer performance data.

In one embodiment, once current offer performance data is generated: the current user's data, and/or current user's attribute data; the recommended offer data, and/or current offer attribute data associated with the offers of the recommended offer data; and the current offer performance data are provided as online training data for the one or more user interest prediction algorithms of the one or more offer/attribute matching models.

In addition, in one embodiment, the recommended offer data, and/or current offer attribute data associated with the offers of the recommended offer data, and/or the current offer performance data are also incorporated in the historical offer performance model training data of the historical offer database for use as future offline model training data. Consequently, in one embodiment, the user's data, and/or user's attribute data, the recommended offer data, and/or current offer attribute data associated with the offers of the recommended offer data, and/or the current offer performance data are used as both online and offline training data.

As noted above, in one specific embodiment, the current offer data includes one or more financial service and product offers that are "quick action" offers related to financial services and products, such as, but not limited to, credit cards and/or lines of credit, or any other financial service or product offers, as discussed herein, and/or as known in the art at the time of filing, and/or as developed after the time of filing, that lend themselves to, or impose, a relatively short response time, or that are likely to be acted upon by the offer receiver in a relatively short timeframe.

As also noted above, in many cases, the offer receiver's response or interaction with the quick action offers are not only conducted within a relatively short time of the offer being made, but the current user's acceptance of the offer, and the offer provider's acceptance of the current user's acceptance of the offer, i.e., the performance of the offer, can be monitored and determined in a relatively short timeframe. This, in turn, allows for relative real-time re-training and automatic adjustment of the one or more offer/attribute matching models, and disclosed methods and systems for using machine learning techniques to identify and recommend relevant offers, to changes in the real world operating environment.

The disclosed embodiments therefore provide a technical solution to the long-standing technical problem in the electronic offer distribution arts of ensuring only offers that are relevant to a given consumer are recommended to that consumer. In addition, the disclosed embodiments provide a technical solution to the Internet-based aggravation of the need for a technical solution to the problem of recommending only relevant offers brought on by virtue of the Internet being used as a platform for the large scale, and relatively inexpensive, distribution of electronic media based offers. Consequently, the present disclosure provides highly efficient, effective, and versatile methods and systems for using machine learning techniques to identify and recommend relevant offers to a user. However, the disclosed embodiments do not encompass, embody, or preclude other forms of innovation in the area of offer recommendation and customization.

In addition, the disclosed embodiments do not represent an abstract idea for at least a few reasons. First, using big data methods to obtain data from millions of users and offers and generate training data to train one or more offer/attribute matching models in an offline environment, using the trained one or more offer/attribute matching models to identify and recommend relevant offers to a specific user using the current user's real time data in an online environment, and then monitoring the performance of the recommend relevant offers and using the resulting offer performance data to further train and improve the one or more offer/attribute matching models in the online environment to provide a self-correcting and dynamically and automatically adjusting offer recommendation system is not an abstract idea because it is not merely an idea itself (e.g., cannot be performed mentally or using pen and paper).

In fact, the disclosed embodiments require the use of special training data, such as, but not limited to, demographic data, account data, clickstream data, transaction data, credit history data, and offer data for two or more, and, in various embodiments, millions, tens of millions, or hundreds of millions or more, users and/or offers, obtained from one or more data sources, such as, but not limited to, one or more data management systems, such as one or more financial management systems. In addition, the disclosed embodiments include the use of machine learning methods to generate and train one or more models, including but not limited to, a user/offer attribute matching model, along with several data extraction and processing engines, and various other data processing algorithms. In fact, some of the disclosed embodiments include creating, and in some embodiments labeling, special model training data sets, developing, applying, and dynamically modifying one or more analytics models using supervised, and/or unsupervised, and/or semi-supervised training processes, and the application of artificial intelligence and structured and/or unstructured user feedback; none of which can be performed mentally or with pen and paper alone.

Second, using big data methods to obtain data from millions of users and offers and generate training data to train one or more offer/attribute matching models in an offline environment, using the trained one or more offer/attribute matching models to identify and recommend relevant offers to a specific user using the current user's real time data in an online environment, and then monitoring the performance of the recommend relevant offers and using the resulting offer performance data to further train and improve the one or more offer/attribute matching models in the online environment to provide a self-correcting and dynamically and automatically adjusting offer recommendation system is not an abstract idea because it is not a fundamental economic practice (e.g., is not merely creating a contractual relationship, hedging, mitigating a settlement risk, etc.).

Third, using big data methods to obtain data from millions of users and offers and generate training data to train one or more offer/attribute matching models in an offline environment, using the trained one or more offer/attribute matching models to identify and recommend relevant offers to a specific user using the current user's real time data in an online environment, and then monitoring the performance of the recommend relevant offers and using the resulting offer performance data to further train and improve the one or more offer/attribute matching models in the online environment to provide a self-correcting and dynamically and automatically adjusting offer recommendation system is not an abstract idea because it is not a method of organizing human activity (e.g., managing a game of bingo).

Fourth, although, in one embodiment, mathematics, and/or unsupervised machine learning, and/or supervised machine learning, and/or semi-supervised machine learning, may be used to generate one or more analytics models, and/or algorithms, the disclosed methods of obtaining model training data from multiple sources, using big data methods to obtain data from millions of users and offers and generate training data to train one or more offer/attribute matching models in an offline environment, using the trained one or more offer/attribute matching models to identify and recommend relevant offers to a specific user using the current user's real time data in an online environment, and then monitoring the performance of the recommend relevant offers and using the resulting offer performance data to further train and improve the one or more offer/attribute matching models in the online environment to provide a self-correcting and dynamically and automatically adjusting offer recommendation system is not simply a mathematical relationship/formula.

Further, using big data methods to obtain data from millions of users and offers and generate training data to train one or more offer/attribute matching models in an offline environment, using the trained one or more offer/attribute matching models to identify and recommend relevant offers to a specific user using the current user's real time data in an online environment, and then monitoring the performance of the recommend relevant offers and using the resulting offer performance data to further train and improve the one or more offer/attribute matching models in the online environment to provide a self-correcting and dynamically and automatically adjusting offer recommendation system represents an ordered combination of elements and operations that adds significantly to the fields of data management, resource management, data distribution management, user experience and communications.

In addition, using big data methods to obtain data from millions of users and offers and generate training data to train one or more offer/attribute matching models in an offline environment, using the trained one or more offer/attribute matching models to identify and recommend relevant offers to a specific user using the current user's real time data in an online environment, and then monitoring the performance of the recommend relevant offers and using the resulting offer performance data to further train and improve the one or more offer/attribute matching models in the online environment to provide a self-correcting and dynamically and automatically adjusting offer recommendation system represents an ordered combination of elements and operations that results in fewer, better targeted, offers being distributed. Consequently, user experience is improved and the amount of memory required for the processing and storage of data, the bandwidth required to transfer data, and amount of data processing cycles utilized can be reduced significantly. As a result, embodiments of the present disclosure allow for reduced use of processor cycles, processor power, communications bandwidth, memory usage, and power consumption. Consequently, computing and communication systems implementing or providing the embodiments of the present disclosure are transformed into more operationally efficient devices and systems.

In addition to improving overall computing performance, using big data methods to obtain data from millions of users and offers and generate training data to train one or more offer/attribute matching models in an offline environment, using the trained one or more offer/attribute matching models to identify and recommend relevant offers to a specific user using the current user's real time data in an online environment, and then monitoring the performance of the recommend relevant offers and using the resulting offer performance data to further train and improve the one or more offer/attribute matching models in the online environment to provide a self-correcting and dynamically and automatically adjusting offer recommendation system represents an ordered combination of elements and operations that allows for more efficient use of both human and non-human resources as offers so generated are fewer, better targeted, and more likely to be relevant, accepted, and utilized. As a result, computing systems are further transformed into faster, more efficient, and more effective computing systems by implementing the methods and systems disclosed herein.

In addition, the disclosed embodiments, address a technical need that is at least aggravated, if not originated, by the use of the Internet as a platform for widely distributing offers relatively cheaply. Consequently, disclosed embodiments, provide a technical solution to address a technical problem associated with the Internet.

Exemplary Training and Runtime Environments

In accordance with one embodiment, the method and system for using machine learning techniques to identify and recommend relevant offers uses one or more offer/attribute matching models. In one embodiment, the one or more offer/attribute matching models are trained using one or more machine leaning techniques in an offline training environment to generate one or more user interest prediction algorithms.

In one embodiment, once the one or more offer/attribute matching models are trained in an offline training environment, the method and system for using machine learning techniques to identify and recommend relevant offers is ready for execution in an online/runtime environment.

In addition, in one embodiment, a current user's actions with respect to the recommended offer of the recommended offer data is monitored and recorded as current offer performance data. In one embodiment, the current offer performance data is then used as online, and in one embodiment both online and offline, training data for the one or more user interest prediction algorithms of the one or more offer/attribute matching models in the online/runtime environment.

The disclosed embodiments therefore include offline model training in an offline training environment, online execution in runtime environment, and online training in the runtime environment.

Figure 2:
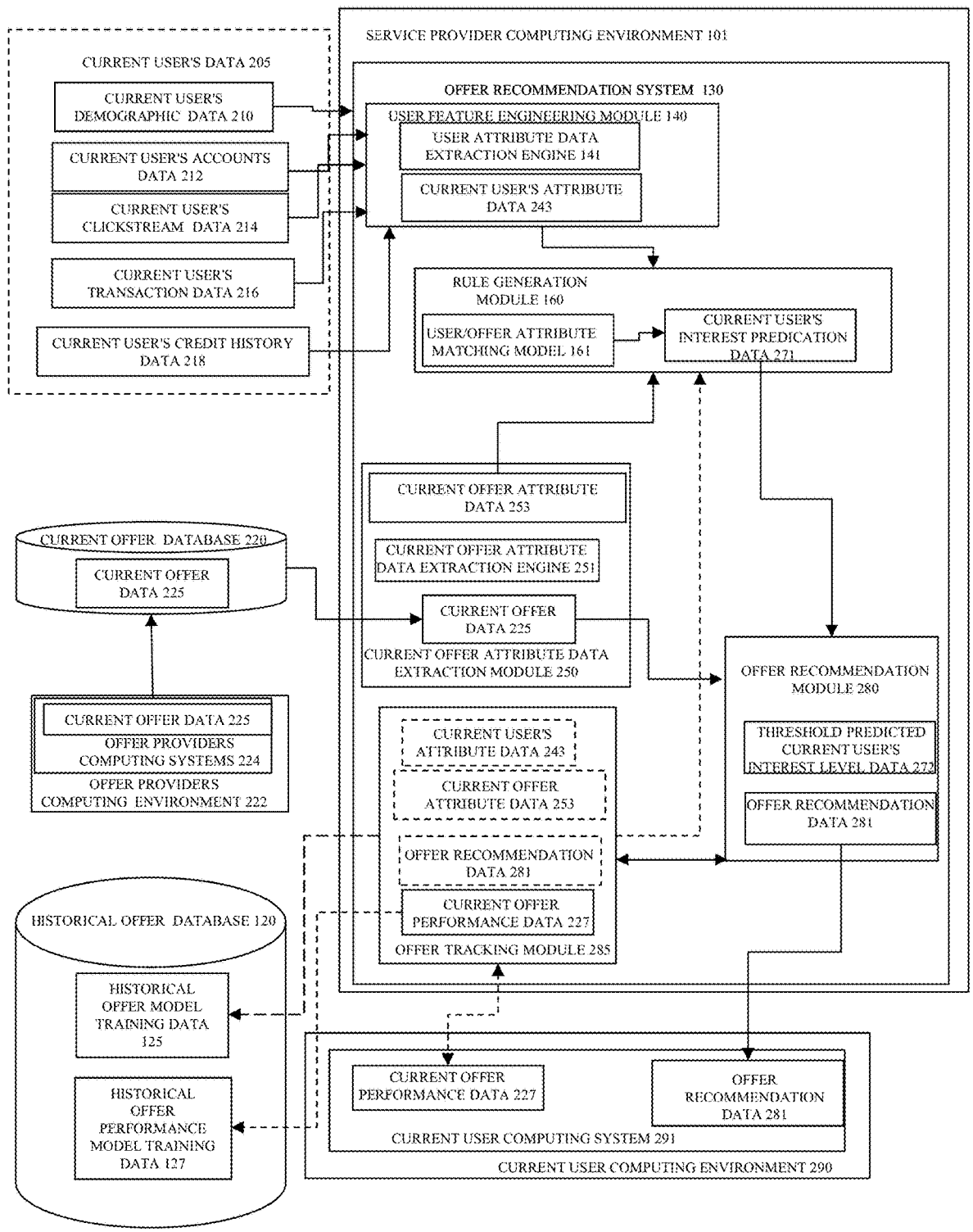
FIG. 2 is a functional block diagram of a runtime environment for implementing runtime execution of a method and system for using machine learning techniques to identify and recommend relevant offers, in accordance with one embodiment.

FIGS. 1 and 2 are exemplary representations of a training environment 100A and runtime environment 100B for implementing a method and system for using machine learning techniques to identify and recommend relevant offers, in accordance with one embodiment. Consequently, FIGS. 1 and 2 include some common features and elements as indicated by common reference numerals used in both FIG.s. However, FIG. 1 is a functional block diagram of a training environment 100A for implementing offline model training of modules and models implementing a method and system for using machine learning techniques to identify and recommend relevant offers, in accordance with one embodiment. On the other hand, FIG. 2 is a functional block diagram of a runtime environment 100B for implementing runtime/online execution and runtime/online training of a method and system for using machine learning techniques to identify and recommend relevant offers, in accordance with one embodiment.

Referring to FIG. 1 and FIG. 2 together, in one embodiment, training environment 100A of FIG. 1 and runtime environment 100B of FIG. 2 both include: service provider computing environment 101, including offer recommendation system 130, shown as implemented in service provider computing environment 101.

Referring to FIG. 1, in one embodiment, training environment 100A includes: a user feature engineering module 140, including a user attribute data extraction engine 141; an offer feature engineering module 150, including an offer attribute and performance data extraction engine 151; and a rule generation module 160, including a user/offer attribute matching model 161.

Since FIG. 1 is a functional block diagram of a training environment 100A for implementing offline model training, FIG. 1 includes model training data 105 including demographic model training data 110, accounts model training data 112, clickstream model training data 114, transaction model training data 116, and credit history model training data 118.

In one embodiment, big data analysis methods are used to access and process multiple sources of user data and obtain raw user data (not shown) associated with two or more, and, in various embodiments, millions, tens of millions, or hundreds of millions or more, users.

As used herein, the terms "user" and "users" is used to denote parties whose data is obtained used as training data to train one or more user/offer attribute matching models and generate one of more user interest prediction algorithms in an offline environment. In contrast, as used herein the term "current user" is used to denote a specific individual party whose data is analyzed by the disclosed method and system for using machine learning techniques to identify and recommend relevant offers in an online runtime/execution environment and, in one embodiment, is used as online training data to train one or more user/offer attribute matching models and generate one of more user interest prediction algorithms in the online environment.

In one embodiment, the user data includes, but is not limited to, one or more of, raw demographic data (not shown), raw accounts data (not shown), raw clickstream data (not shown), raw transaction data (not shown), and raw credit history data (not shown) associated with the two or more, and, in various embodiments, millions, tens of millions, or hundreds of millions or more, users.

In one embodiment, the raw demographic data portion of the user data includes, but is not limited to, age data, location data, employment data, income data, debt load data, savings data, and/or any other demographic data indicating a grouping or status of the users as discussed herein, and/or as known in the art of the time of filing, and/or as developed after the time of filing. In various embodiments, the demographic data is associated with two or more, and, in various embodiments, millions, tens of millions, or hundreds of millions or more, users. In one embodiment, the raw demographic data is obtained, at least in part, from, or through, one or more data management systems, such as, but not limited to, one or more financial management systems (not shown).

In one embodiment, the raw accounts data portion of the user data includes, but is not limited to: data indicating names of credit, savings, checking, retirement, loan, or any other financial accounts associated with the users; data indicating the financial institutions, such as banks or credit card providers, associated with credit, savings, checking, retirement, loan, or any other financial accounts associated with the users; data indicating the types of credit, savings, checking, retirement, loan, or any other financial accounts associated with the users; access data associated with credit, savings, checking, retirement, loan, or any other financial accounts associated with the users; terms of use, interest rates, operational data, and/or current status of credit, savings, checking, retirement, loan, or any other financial accounts associated with the users; data indicating the types of rewards, and use of rewards, such as cashback, travel points, annual percentage rates, associated with the credit, savings, checking, retirement, loan, or any other financial accounts associated with the users; and/or any other accounts data connected to credit, savings, checking, retirement, loan, or any other financial accounts associated with the users as discussed herein, and/or as known in the art at the time of filing, and/or as developed, or becomes available, after the time of filing. In one embodiment, the accounts data is obtained, at least in part, from, or through, one or more data management systems, such as, but not limited to, one or more financial management systems (not shown).

In one embodiment, the raw clickstream data portion of the user data includes, but is not limited to: data indicating the users' activity within, and level of use of, one or more data management systems; data indicating what offers or offer applications a user has viewed and the time users spent viewing offers; data indicating the users engagement with financial offers and use of financial offers; data indicating the users' types of activity and how they use one or more data management systems; data indicating the length of time the users use one or more data management systems; and/or any other data indicating the users engagement with computers, applications, websites, the Internet, or any other networking, communications, or data access, technology, as discussed herein, and/or as known in the art at the time of filing, and/or as developed, or becomes available, after the time of filing. In various embodiments, the raw clickstream data is associated with two or more, and, in various embodiments, millions, tens of millions, or hundreds of millions or more, users. In one embodiment, the raw clickstream data is obtained, at least in part, from, or through, one or more data management systems, such as, but not limited to, one or more financial management systems (not shown).

In one embodiment, the raw transaction data portion of the user data includes, but is not limited to: data indicating historical transaction amounts, payees, and locations, recurrence and/or frequency of transactions; data indicating withdrawals, mortgage/rent payments, credit card payments, charitable contributions, alimony or child support payments; data representing expense transactions, income transactions, insurance payments; data indicating whether the users are spenders or savers; data indicating whether the users travel; data indicating whether the users are borrowers and, if so, what type of borrowers; data indicating where the users shop and the type of shops the users frequent; and/or any transaction data as discussed herein, and/or as known in the art at the time of filing, and/or as developed, or becomes available, after the time of filing. In various embodiments, the raw transaction data is associated with two or more, and, in various embodiments, millions, tens of millions, or hundreds of millions or more, users. In one embodiment, the raw transaction data is obtained, at least in part, from, or through, one or more data management systems, such as, but not limited to, one or more financial management systems (not shown).

In one embodiment, the raw credit history data portion of the user data includes, but is not limited to: credit card accounts data such as, but not limited to, account names and account holder names, balance data, status data, open and close date data, payment history data, and credit limit data; loan/mortgage data such as, but not limited to, initial mortgage/loan amount data and balance data, mortgage/loan term data, mortgage/loan payment history data, mortgage/loan status data, mortgage/loan interest rate, and mortgage/loan type data; current and historical credit scores; debt to income ratio data; savings, checking, and overdraft account balances; personal information such as, but not limited to, names, addresses, birth dates, marital status, phone numbers, employer and employment history; and/or any other credit and financial situational data indicating the credit and financial position of the users, as discussed herein, and/or as known in the art at the time of filing, and/or as developed or made available after the time of filing. In various embodiments, the raw credit history data is associated with two or more, and, in various embodiments, millions, tens of millions, or hundreds of millions or more, users. In one embodiment, the raw credit history data is obtained, at least in part, from, or through, one or more data management systems, such as, but not limited to, one or more financial management systems (not shown).

In one embodiment, all the user data, including but not limited to, the raw demographic data, the raw accounts data, the raw clickstream data, the raw transaction data, and the raw credit history data is sanitized to remove all data, such as Personal Identification Data (PID), that could be used to identify any individual user, directly or indirectly, access an individual current user's data or accounts, or otherwise reveal personal information about a specific user.

In one embodiment, once access to the user data is obtained, the user data, such as, but not limited to, the raw demographic data, the raw accounts data, the raw clickstream data, the raw transaction data, and the raw credit history data, is parsed, analyzed, labeled, formatted, and/or otherwise processed, to transform the user data, into model training data 105, including, but into limited to, demographic model training data 110, accounts model training data 112, clickstream model training data 114, transaction model training data 116, and credit history model training data 118. As discussed below, in one embodiment, respective portions of the model training data are then used to train various models of operational modules used for implementing the disclosed methods and systems for using machine learning techniques to identify and recommend relevant offers to users.

In one embodiment, the demographic model training data 110, accounts model training data 112, clickstream model training data 114, transaction model training data 116, and credit history model training data 118 portions of the model training data 105 are analyzed and processed to identify user attributes in the user model training data and generate user attribute model training data 143 associated with each of the two or more users/consumers, and, in various embodiments, the millions, tens of millions, or hundreds of millions or more, users/consumers represented in the user model training data 105.

To this end, in one embodiment, user feature engineering module 140 is provided access to model training data 105, including, but not limited to, demographic model training data 110, accounts model training data 112, clickstream model training data 114, transaction model training data 116, and credit history model training data 118 of the model training data 105.

In one embodiment, user feature engineering module 140 includes user attribute data extraction engine 141. In one embodiment, the user attribute data extraction engine 141 uses one or more processors and one of more data extraction algorithms to identify user attributes in the user model training data and generate user attribute model training data 143 associated with each of the two or more users/consumers, and, in various embodiments, the millions, tens of millions, or hundreds of millions or more, users/consumers represented in the model training data 105.

In one embodiment, user attribute data extraction engine 141 uses natural language processing (NLP) methods, or similar techniques, and/or one or more algorithms to identify user attributes in the user model training data and generate user attribute model training data 143.

In one embodiment, user attribute model training data 143 includes attribute data indicating age group, income group, general user characteristics, user health, user education, user employment, user residence area, user financial preferences, user financial behavior, e.g., is the user a spender or saver, user risk tolerance, e.g., is the user financially risk tolerant or risk adverse, historical transaction amounts, payees, and locations, recurrence and/or frequency of transactions, withdrawals, mortgage/rent payments, credit card payments, charitable contributions, alimony or child support payments, expenses, income, insurance payments; credit card accounts data such as, but not limited to, account names and account holder names, balance data, status data, open and close date data, payment history data, and credit limit data; loan/mortgage data such as, but not limited to, initial mortgage/loan amount data and balance data, mortgage/loan term data, mortgage/loan payment history data, mortgage/loan status data, mortgage/loan interest rate, and mortgage/loan type data; current and historical credit scores; debt to income ratio data; savings, checking, and overdraft account balances; personal information such as, but not limited to, names, addresses, birth dates, marital status, phone numbers, employer and employment history; spending characteristics of the users, merchants used, types of purchases, products and services recently or historically purchased, general financial health, general financial characteristics, and/or any other current user's attributes, as discussed herein, and/or as known in the art at the time of filing, and/or as become known after the time of filing.

As seen in FIG. 1, model training data 105 includes historical offer database 120, including historical offer model training data 125 and historical offer performance model training data 127. In one embodiment, historical offer model training data 125 is obtained, at least in part, from, or through, one or more data management systems used by the users and/or providers of products and/or services and is stored in historical offer database 120.

In one embodiment, the historical offer model training data 125 is accessed by offer feature engineering module 150 and offer attribute and performance data extraction engine 151. In one embodiment, offer attribute and performance data extraction engine 151 uses one or more processors and/or one or more algorithms to to identify and extract historical offer attribute data, such as historical offer attribute model training data 153 representing various offer attributes.

In one embodiment, offer attribute and performance data extraction engine 151 uses one or more processors and/or one or more algorithms to to identify and extract historical offer performance model training data 155.

In one embodiment, offer attribute and performance data extraction engine 151 uses natural language processing (NLP) methods, or similar techniques, and one or more algorithms to identify and extract historical offer attribute data, and historical offer attribute model training data 153 and historical offer performance model training data 155.

In various embodiments, the historical offer attribute model training data 153 includes, but is not limited to, data indicating: the names of providers, such as financial institutions, associated with the offers; categories of the providers, such as financial institutions, associated with the offers; terms of the offers; rewards or loyalty programs associated with the offers; and approval criteria and/or acceptance rates associated with the offers. In various embodiments, the offer attribute data includes any other offer attribute data indicating the nature, requirements, operation, or structure of the offers as discussed herein, and/or as known in the art at the time of filing, and/or as developed or made available after the time of filing.

In various embodiments, the historical offer performance model training data 155 includes, but is not limited to, one or more of: data indicating whether a given historical offer made to a user was clicked on, or otherwise interacted with, by the user; data indicating if an application, website, or any other location or form associated with historical offer made to a user was accessed, interacted with, or otherwise observed by the user and, if so, how long the user observed or interacted with the location or form; data indicating if a user to whom an historical offer was made applied for, or otherwise tried to accept, the historical offer; data indicating if a user's attempted acceptance of a historical offer resulted in the user receiving the product or service that was the subject matter of the historical offer; feedback or ratings data from the user regarding the historical offer; and/or any other historical offer performance data as discussed herein, and/or as known in the art at the time of filing, and/or as developed or made available after the time of filing.

In one embodiment, the historical offers represented in the historical offer model training data 125 of the user model training data are correlated to the respective users represented in the model training data 105 to whom the historical offers were made. As noted above, in one embodiment, the historical offer model training data 125 is analyzed and processed to identify historical offer attributes and generate historical offer attribute model training data 153 associated with the historical offers represented in the historical offer model training data 125. Consequently, in various embodiments, the historical offer model training data 125 includes historical offer model training attribute data 153 associated with two or more historical offers and users, and, in various embodiments, millions, tens of millions, or hundreds of millions or more, historical offers and users/consumers.

In one embodiment, the historical offer model training data 125 associated with each historical offer is then correlated to the respective users represented in the model training data 105 to whom the historical offers were made and the user attribute model training data 143 associated with the respective users represented in the model training data 105 to whom the historical offers were made. In addition, in one embodiment, the offers represented in the historical offer model training data 125 are correlated their respective historical offer performance model training data 127. Consequently, in one embodiment, historical offer attribute model training data 153 associated with two or more historical offers, and in various embodiments, millions, tens of millions, or hundreds of millions or more, historical offers, and the historical offer performance model training data 155 associated with each of the historical offers, is correlated to user attribute model training data 143 associated with each of the two or more users/consumers, and, in various embodiments, the millions, tens of millions, or hundreds of millions or more, users/consumers to whom the historical offers were made.

In one embodiment, the correlated user attribute model training data 143, historical offer attribute model training data 153, and the historical offer performance model training data 155 associated with the two or more users/consumers and historical offers, and, in various embodiments, the millions, tens of millions, or hundreds of millions or more, users/consumers and historical offers is then provided as training data for one or more offer/attribute matching models, such as user/offer attribute matching model 161 of rule generation module 160.

In one embodiment, in an offline training environment, such as training environment 100A of FIG. 1, user/offer attribute matching model 161 of rule generation module 160 uses the correlated user attribute model training data 143, historical offer attribute model training data 153, and the historical offer performance model training data 155 to generate one or more user interest prediction algorithms (not shown). Then, in one embodiment, in an online runtime/execution environment, the one or more user interest prediction algorithms (not shown) are used for matching current active offers to a specific current user and predicting a level of interest in the active current offers by the current user.

In one embodiment, the correlated user attribute model training data 143, historical offer attribute model training data 153, and the historical offer performance model training data 155 for multiple, and, in various embodiments, millions, tens of millions, or hundreds of millions or more, users and/or offers is processed and labeled for use as model training data for the user/offer attribute matching model 161 of the rule generation module 160. In one embodiment, the correlated user attribute model training data 143, historical offer attribute model training data 153, and the historical offer performance model training data 155 are used to generate and train one or more machine learning based user/offer attribute matching models 161 to correlate the various user attributes to offer attributes, in one embodiment on a user attribute/offer attribute pair basis.

In one embodiment, the user/offer attribute matching model 161 uses user attribute and offer attribute pairs (not shown) as inputs and portions of one or more of the model training data as labels to train a mapping model such as a logistic regression model. In various embodiments, the user/offer attribute matching model 161 is any other mapping model as discussed herein, and/or as known or available in the art at the time of filing, and/or as is developed or comes available after the time of filing.

FIG. 3 is an illustrative example of a machine learning data structure 310 for training a user/offer attribute matching model of a feature engineering module, in accordance with one embodiment. As seen in FIG. 3, user attribute model training data 143, including, in this specific illustrative example, user age data, and user credit score data are matched to historical offer attribute model training data 153 including, in this specific illustrative example, institution name, i.e., offer provider data, type of offer data, and rewards data. In the specific illustrative example of FIG. 3, a user usage value 315 of "1" indicates a user attribute/historical offer attribute match and a user usage value of "0" indicates a user attribute/historical offer attribute non-match.

Returning to FIG. 1, in one embodiment, once the one or more offer/attribute matching models 161 are trained using the correlated user attribute model training data 143, historical offer attribute model training data 153, and the historical offer performance model training data 155 in the offline training environment 100A, as shown in FIG. 1, the method and system for using machine learning techniques to identify and recommend relevant offers is ready for execution in the online/runtime environment 100B of FIG. 2.

As noted above, FIGS. 1 and 2 include many common features as indicated by common reference numerals used in both FIG.s. However, while FIG. 1 is a functional block diagram of a training environment 100A for implementing offline model training of a method and system for using machine learning techniques to identify and recommend relevant offers, in accordance with one embodiment, FIG. 2 is a functional block diagram of a runtime environment 100B for implementing runtime execution of a method and system for using machine learning techniques to identify and recommend relevant offers, in accordance with one embodiment.

Referring to FIG. 2, in one embodiment, runtime environment 100B includes: service provider computing environment 101 including offer recommendation system 130; current user's data 205, including, but not limited to, current user's demographic data 210, current user's accounts data 212, current user's clickstream data 214, current user's transaction data 216, and current user's credit history data 218; current offer database 220, including current offer data 225; offer providers' computing environment 222, including offer providers computing systems 224 for providing current offer data 225 to current offer database 220; current user computing environment 290, including current user computing system 291 for receiving offer recommendation data 281 and providing current offer performance data 227. In one embodiment, runtime environment 100B includes the historical offer database 120 of training environment 100A, including historical offer performance model training data 127 to which is added current offer performance data 227 as discussed below.

Referring to FIG. 2, in one embodiment, once the various modules and models are generated and trained using the respective portion of the model training data as discussed above with respect to FIG. 1, the runtime model is executed for a specific, i.e., a given, user, also referred to herein as a current user, in runtime environment 100B of FIG. 2.

As noted above, as used herein, the terms "user" and "users" is used to denote parties whose data is obtained used as training data to train one or more user/offer attribute matching models and generate one or more user interest prediction algorithms in an offline environment. In contrast, as used herein the term "current user" is used to denote a specific individual party whose data is analyzed by the disclosed method and system for using machine learning techniques to identify and recommend relevant offers in an online runtime/execution environment and, in one embodiment, is used as online training data to train one or more user/offer attribute matching models and generate one of more user interest prediction algorithms in the online environment.

In one embodiment, runtime execution of the method and system for using machine learning techniques to identify and recommend relevant offers is performed using a given current user's data. To this end, in one embodiment, current user's data 205 representing data associated with the specific given user is obtained from one or more sources of current user's data. In one embodiment, the current user's data 205 includes, but is not limited to, one or more of current user's demographic data 210, current user's accounts data 212, current user's clickstream data 214, current user's transaction data 216, current user's credit history data 218, and/or any other current user's data as discussed herein, and/or as known in the art at the time of filing, and/or as become known after the time of filing.

In one embodiment, current user's data 205 is obtained from any one or more of the sources of demographic data, accounts data, clickstream data, transaction data, and credit history data associated with a user such as, but not limited to, one or more data management systems associated with the user, live data feeds from clickstream or other interactive data sources, monitoring data received from offer tracking module 285 as discussed below, or any one or more other sources of user or current user data as discussed herein, and/or as known or available in the art at the time of filing, and/or as becomes known or available after the time of filing.

In one embodiment, current user's demographic data 210 includes, but is not limited to, one or more of, age data, location data, employment data, income data, debt load data, savings data, and/or any other demographic data indicating a grouping or status of the current user as discussed herein, and/or as known in the art of the time of filing, and/or as developed after the time of filing.

In one embodiment, current user's accounts data 212 includes, but is not limited to, one or more of: data indicating names of credit, savings, checking, retirement, loan, or any other financial accounts associated with the current user; data indicating the financial institutions, such as banks or credit card providers, associated with credit, savings, checking, retirement, loan, or any other financial accounts associated with the current user; data indicating the types of credit, savings, checking, retirement, loan, or any other financial accounts associated with the current user; access data associated with credit, savings, checking, retirement, loan, or any other financial accounts associated with the current user; terms of use, interest rates, operational data, and/or current status of credit, savings, checking, retirement, loan, or any other financial accounts associated with the current user; data indicating the types of rewards, and use of rewards, such as cashback, travel points, annual percentage rates, associated with the credit, savings, checking, retirement, loan, or any other financial accounts associated with the current user; and/or any other accounts data connected to credit, savings, checking, retirement, loan, or any other financial accounts associated with the current user as discussed herein, and/or as known in the art at the time of filing, and/or as developed, or becomes available, after the time of filing.

In one embodiment, current user's clickstream data 214 includes, but is not limited to, one or more of: data indicating the current user's activity within, and level of use of, one or more data management systems; data indicating what offers or offer applications the current user has viewed and the time the current user spent viewing offers; data indicating the current user's engagement with financial offers and use of financial offers; data indicating the current user's types of activity and how the current user used one or more data management systems; data indicating the length of time the current user uses one or more data management systems; and/or any other data indicating the current user's engagement with computers, applications, websites, the Internet, or any other networking, communications, or data access, technology, as discussed herein, and/or as known in the art at the time of filing, and/or as developed, or becomes available, after the time of filing.

In one embodiment, current user's transaction data 216 includes, but is not limited to, one or more of data indicating historical transaction amounts, payees, and locations, recurrence and/or frequency of transactions; data indicating withdrawals, mortgage/rent payments, credit card payments, charitable contributions, alimony or child support payments; data representing expense transactions, income transactions, insurance payments; data indicating whether the current user is a spender or saver; data indicating whether the current user travels; data indicating whether the current user is a borrower and, if so, what type of borrower; data indicating where the current user shops and the type of shops the current user frequents; and/or any transaction data as discussed herein, and/or as known in the art at the time of filing, and/or as developed, or becomes available, after the time of filing.

In one embodiment, current user's credit history data 218 includes, but is not limited to: credit card accounts data such as, but not limited to, account names and account holder names, balance data, status data, open and close date data, payment history data, and credit limit data; loan/mortgage data such as, but not limited to, initial mortgage/loan amount data and balance data, mortgage/loan term data, mortgage/loan payment history data, mortgage/loan status data, mortgage/loan interest rate, and mortgage/loan type data; current and historical credit scores; debt to income ratio data; savings, checking, and overdraft account balances; personal information such as, but not limited to, names, addresses, birth dates, marital status, phone numbers, employer and employment history; and/or any other credit and financial situational data indicating the credit and financial position of the current user, as discussed herein, and/or as known in the art at the time of filing, and/or as developed or made available after the time of filing.

In one embodiment, all the current user's data 205, including but not limited to, the current user's demographic data 210, the current user's accounts data 212, the current user's clickstream data 214, the current user's transaction data 216, and the current user's credit history data 218 is sanitized to remove all data, such as Personal Identification Data (PID), that could be used to identify the current user, directly or indirectly, access the current user's data or accounts, or otherwise reveal personal information about the current user.

In one embodiment, the current user's data 205, including but not limited to, the current user's demographic data 210, the current user's accounts data 212, the current user's clickstream data 214, the current user's transaction data 216, and the current user's credit history data 218 is parsed, analyzed, labeled, formatted, and/or otherwise processed to put the data in a standard processing format.

Referring back to FIG. 2, in one embodiment, runtime environment 100B and offer recommendation system 130 include the current user feature engineering module 140. In one embodiment, the current user's demographic data 210, current user's accounts data 212, current user's clickstream data 214, current user's transaction data 216, and current user's credit history data 218 are used by the current user attribute data extraction engine 141 of the current user feature engineering module 140 at execution of user feature engineering module 140 to generate current user's attribute data 243 for the current user.

In one embodiment the current user's attribute data 243 represents various current user attributes such as, but not limited to, age group, income group, general current user characteristics, current user health, current user education, current user employment, current user residence area, current user financial preferences, current user financial behavior, e.g., is the current user a spender or saver, current user risk tolerance, e.g., is the current user financially risk tolerant or risk adverse, historical transaction amounts, payees, and locations, recurrence and/or frequency of transactions, withdrawals, mortgage/rent payments, credit card payments, charitable contributions, alimony or child support payments, expenses, income, insurance payments; credit card accounts data such as, but not limited to, account names and account holder names, balance data, status data, open and close date data, payment history data, and credit limit data; loan/mortgage data such as, but not limited to, initial mortgage/loan amount data and balance data, mortgage/loan term data, mortgage/loan payment history data, mortgage/loan status data, mortgage/loan interest rate, and mortgage/loan type data; current and historical credit scores; debt to income ratio data; savings, checking, and overdraft account balances; personal information such as, but not limited to, names, addresses, birth dates, marital status, phone numbers, employer and employment history; spending characteristics of the current users, merchants used, types of purchases, products and services recently or historically purchased, general financial health, general financial characteristics, and/or any other current user's attributes, as discussed herein, and/or as known in the art at the time of filing, and/or as become known after the time of filing.

As seen in FIG. 2, runtime environment 100B includes current offer database 220 including current offer data 225. In one embodiment, current offer data 225 is obtained, at least in part, from, or through, offer providers using offer providers computing systems 224 of offer providers computing environment 222.

In various embodiments, current offer data 225 represents active offers related to products and/or services. In various embodiments, the current offer data 225 includes data such as, but not limited to: the names of providers, such as financial institutions, associated with the offers; categories of the providers, such as financial institutions, associated with the offers; terms of the offers; rewards or loyalty programs associated with the offers; and approval criteria and/or acceptance rates associated with the offers. In various embodiments, the current offer data 225 includes any other offer data indicating the nature, requirements, operation, or structure of the current offers as discussed herein, and/or as known in the art at the time of filing, and/or as developed or made available after the time of filing.

As noted above, in one specific embodiment, the current offer data 225 includes one or more financial service and product offers that are "quick action" offers related to financial services and products, such as, but not limited to, credit cards and/or lines of credit, or any other financial service or product offers, as discussed herein, and/or as known in the art at the time of filing, and/or as developed after the time of filing, that lend themselves to, or impose, a relatively short response time, or that are likely to be acted upon by the offer receiver in a relatively short timeframe.

As seen in FIG. 2, offer recommendation system 130 incudes current offer attribute data extraction module 250, including current offer attribute data extraction engine 251. In one embodiment, current offer attribute data extraction engine 251 is used to register and extract current offer attribute data 253 from current offer data 225. To this end, in one embodiment, current offer data 225 is accessed by current offer attribute data extraction module 250, including current offer attribute data extraction engine 251. In one embodiment current offer attribute data extraction engine 251 uses one or more processors and/or one or more algorithms to to identify and extract offer attribute data, such as current offer attribute data 253, representing various current offer attributes.

In one embodiment, current offer attribute data extraction engine 251 uses natural language processing (NLP) methods, or similar techniques, and one or more algorithms to identify and extract current offer attribute data 253. In various embodiments, the current offer attribute data 253 includes, but is not limited to, data indicating: the names of providers, such as financial institutions, associated with the current offers; categories of the providers, such as financial institutions, associated with the current offers; terms of the offers; rewards or loyalty programs associated with the current offers; and approval criteria and/or acceptance rates associated with the current offers. In various embodiments, the current offer attribute data 253 includes any other offer attribute data indicating the nature, requirements, operation, or structure of the current offers as discussed herein, and/or as known in the art at the time of filing, and/or as developed or made available after the time of filing.

In one embodiment, the current offer attribute data 253 associated with each current offer in the current offer data 225 is correlated to the respective current offer.

In one embodiment, current user's attribute data 243 and current offer attribute data 253 are provided as input data to the rule generation module 160 and the one or more user interest prediction algorithms (not shown) of the offer/attribute matching model 161.

In one embodiment, the rule generation module 160 is then executed using the current user's attribute data, i.e., the current user's attribute data 243 from the user feature engineering module 140, and the current offer attribute data 253 from the current offer attribute data extraction module 250 as inputs and outputting current user's interest prediction data 271.

In one embodiment, the one or more user interest prediction algorithms (not shown) of the offer/attribute matching model 161 of the rule generation module 160 use current user's attribute/offer attribute pairs (not shown) and portions of the current user's demographic data 210, the current user's accounts data 212, and the current user's clickstream data 214, the current user's transaction data 216, and the current user's credit history data 218 as input data.

In one embodiment, the current user's attribute data 243 and the current offer attribute data 253 are processed by the one or more user interest prediction algorithms of the offer/attribute matching model 161 to generate current user's interest prediction data 271 indicating the predicted interest of the current user for each of the current offers in the current offer data 225.

In one embodiment, a threshold predicted current user's interest level as indicated by a threshold value represented by current user's interest prediction data 271 is defined and threshold predicted current user's interest level data 272 is generated and provided to offer recommendation module 280 as discussed below.

As seen in FIG. 2, offer recommendation system 130 includes offer recommendation module 280. In one embodiment, the offer recommendation module 280 is executed by using one or more processors and one or more algorithms, such as data comparison algorithms, to compare the current user's interest prediction data 271 for each current offer of current offer data 225 to the threshold predicted current user's interest level data 272. In one embodiment, offer recommendation module 280 transforms the portion of the current offer data 225 representing current offers having a current user's interest level, as indicated by the associated current user's interest prediction data 271, at least as great as the threshold predicted current user's interest level indicated by the threshold predicted current user's interest level data 272 into offer recommendation data 281 that includes the portion of the current offer data 225 representing one or more current offers having a threshold current user's interest level.

In one embodiment, the offer recommendation data 281 is then provided to the user by offer recommendation module 280. In one embodiment, offer recommendation module 280 provides offer recommendation data 281 to the current user's computing system 291 in current user computing environment 290.

In one embodiment, the offer recommendation data 281 represents a listing of one or more offers recommended to the user. In one embodiment, the recommended offers of offer recommendation data 281 are listed and ranked according to the degree, and any weighting, of current user's attribute and offer attribute matching, and/or other current user indicated parameters. In one embodiment, the analysis parameters, features, assumptions, and/or processes used to perform the ranking is included in the offer recommendation data 281. In one embodiment, the current user's interest prediction data 271 or each recommended offer in offer recommendation data 281 is provided to the current user as part of the offer recommendation data 281. In one embodiment, the offer recommendation data 281 includes a score or ranking indicating the likelihood of the user successfully obtaining the product or service that is the subject of the recommended offers represented in offer recommendation data 281 and, in one embodiment, key factors and considerations used to process, recommend, and rank the offers.

Figure 4:
FIG. 4 is an illustrative example of a user interface screen including an offer recommendation display of offer recommendation data, in accordance with one embodiment.

FIG. 4 shows an illustrative example of offer recommendation data provided via a data management system user interface display 403 displayed on a user computing system display screen 401 of a user computing system 400, which, in this specific illustrative example, is a smart phone.

Referring to FIGS. 1, 2, and 4 together, as seen in FIG. 4, the offer recommendation data 281 is provided via a data management system user interface display 403 and includes listing of recommended offers 410 which, in this specific illustrative example, includes an offer listing including credit card offer 411.

As also seen in FIG. 4, the offer recommendation data 281 provided via the data management system user interface display 403 and credit card offer 411 includes likelihood score 421 indicating the calculated likelihood of the user successfully obtaining/qualifying for the credit card of credit card offer 411 is "very good."

As also seen in FIG. 4, offer recommendation data 281 provided via the data management system user interface display 403 and credit card offer 411 includes current user's attribute/offer attribute match 423 indicting the analysis parameters, features, assumptions, and/or processes used to perform the ranking; in this specific example, that the credit card of credit card offer 411 is great for getting cash.

As also seen in FIG. 4, offer recommendation data 281 provided via the data management system user interface display 403 and credit card offer 411 includes a listing of parameters/features 425 indicating matched current user's/ offer attribute pairs and/or key factors and considerations used to process, recommend, and rank credit card offer 411.

Those of skill in the art will readily recognize that FIG. 4 is but one illustrative example of a mechanism/process for providing offer recommendations to a user and that numerous other examples, computing systems, displays and embodiments are possible and contemplated. Consequently. The specific example shown in FIG. 4 should not be read to limit the scope of the claims as set forth below.

Returning to FIG. 2, in one embodiment, offer recommendation system 130 includes offer tracking module 285. In one embodiment, offer tracking module 285 is used to monitor the current user's actions with respect to the recommended offers of the offer recommendation data 281. In one embodiment, the current user's actions with respect to the recommended offers of the offer recommendation data 281 is recorded by offer tracking module 285 and used to generate current offer performance data 227.

In one embodiment, once current offer performance data 227 is generated, the offer tracking module 285 provides the current user's data 205, and/or current user's attribute data 243, the offer recommendation data 281 and/or current offer attribute data 253 associated with the offers of the offer recommendation data 281, and the current offer performance data 227 back to rule generation module 160 (as indicated by dashed lines in FIG. 2). In one embodiment, at rule generation module 160, the current user's data 205, and/or current user's attribute data 243, the offer recommendation data 281 and/or current offer attribute data 253 associated with the offers of the offer recommendation data 281, and the current offer performance data 227 is used as online training data for the one or more user interest prediction algorithms (not shown) of the offer/attribute matching model 161.

In addition, in one embodiment, the offer recommendation data 281 and/or portions of the current offer attribute data 253 associated with the offers of the offer recommendation data 281, and the current offer performance data 227 are also incorporated in the historical offer performance model training data 127 of the historical offer database 120 (as indicated by dashed lines in FIG. 2) for use as future model training data.

As noted above, in one specific embodiment, the current offer data 225 includes one or more financial service and product offers that are "quick action" offers related to financial services and products, such as, but not limited to, credit cards and/or lines of credit, or any other financial service or product offers, as discussed herein, and/or as known in the art at the time of filing, and/or as developed after the time of filing, that lend themselves to, or impose, a relatively short response time, or that are likely to be acted upon by the offer receiver in a relatively short timeframe.

As also noted above, in many cases, the offer receiver's, i.e., the current user's response or interaction with the quick action offers are not only often conducted within a relatively short time of the offer being made, but the current user's acceptance of the offer, and the offer provider's acceptance of the current user's acceptance of the offer, i.e., the performance of the offer, can be monitored and determined in a relatively short timeframe by offer tracking module 285. This, in turn, allows for relative real-time re-training and automatic adjustment of the one or more offer/attribute matching models, and disclosed methods and systems for using machine learning techniques to identify and recommend relevant offers to changes in the real world operating environment.

Exemplary Processes

As noted above, in one embodiment, once the various modules and models are generated and trained using the respective portion of the model training data as discussed above with respect to FIG. 1, the runtime model is executed for a specific, i.e., a given, user, also referred to herein as a current user.

Figure 5:
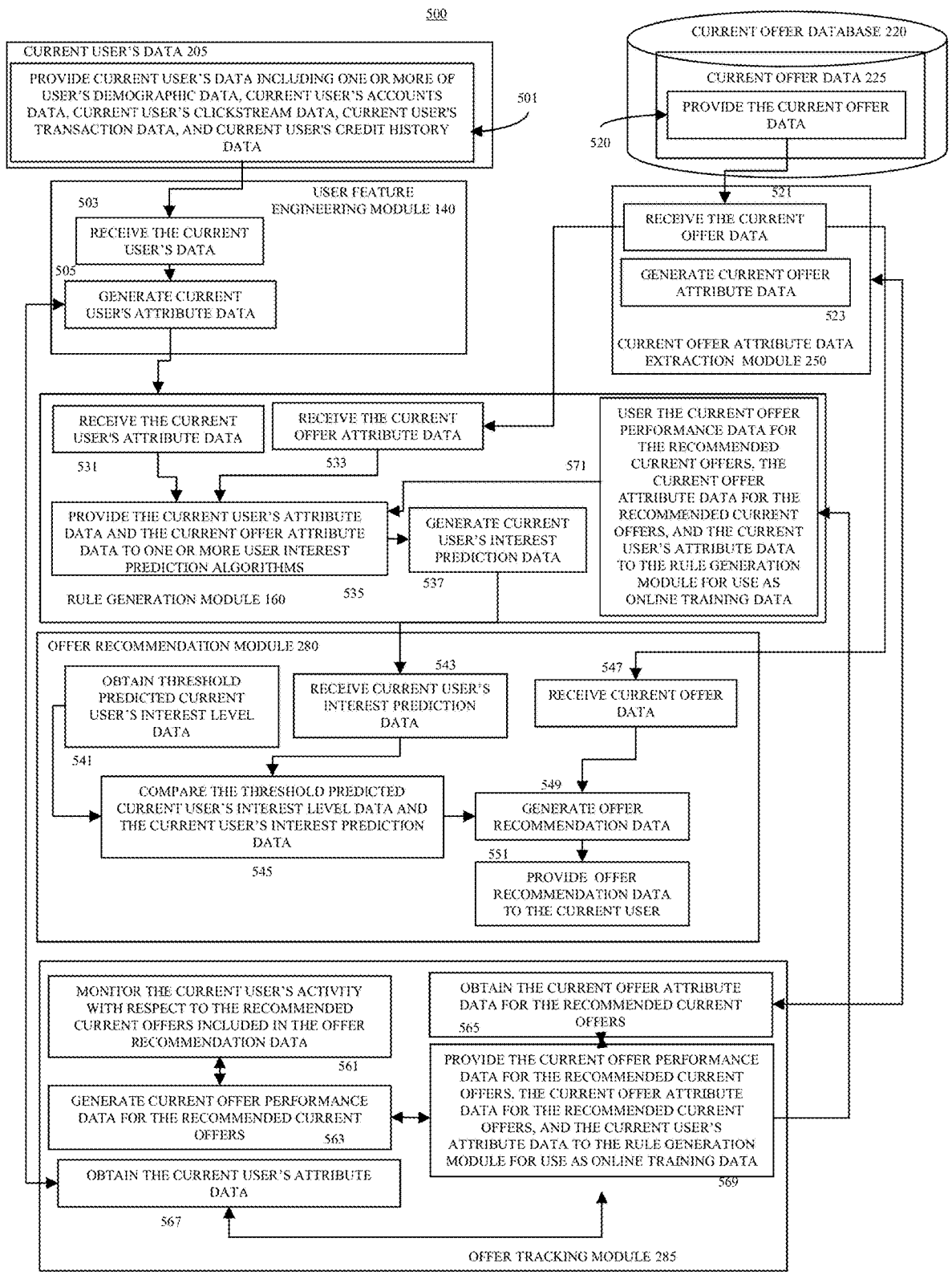
FIG. 5 is a hybrid functional and flow diagram of the runtime execution of a method and system for using machine learning techniques to identify and recommend relevant offers, in accordance with one embodiment.

FIG. 5 is a hybrid functional and flow diagram 500 of the online runtime execution of a method and system for using machine learning techniques to identify and recommend relevant offers, in accordance with one embodiment.

Referring to FIGS. 1, 2, and 5 together, in one embodiment, current user's data 205, including, but not limited to, current user's demographic data 210, current user's accounts data 212, current user's clickstream data 214, current user's transaction data 216, and current user's credit history data 218 for the current user is obtained from any one or more of the sources of current user's data, and/or user data, discussed herein, and/or as known in the art at the time of filing, and/or as become known after the time of filing.

In one embodiment, at 501, the current user's demographic data 210, current user's accounts data 212, current user's clickstream data 214, current user's transaction data 216, and current user's credit history data 218 for the current user is provided for runtime execution of a method and system for using machine learning techniques to identify and recommend relevant offers, in accordance with one embodiment.

In one embodiment, the user feature engineering module 140 is then executed. In one embodiment, at 503, the current user's data 205 is received by user feature engineering module 140. Then, at 505, the current user's demographic data 210, current user's accounts data 212, current user's clickstream data 214, current user's transaction data 216, and current user's credit history data 218 are used by the user attribute data extraction engine 141 of user feature engineering module 140 to generate current user's attribute data 243 for the current user.

In one embodiment, at 520, current offer data 225 is provided from current offer database 220 and, at 521 the current offer data 225 is received by current offer attribute data extraction module 250.

In one embodiment, at 523, the current offer attribute data extraction module 250 uses the current offer attribute data extraction engine 251 to identify and extract current offer attributes from the offers of current offer data 225 and generate current offer attribute data 253.

In one embodiment, at 531, the current user's attribute data 243 is received by rule generation module 160 and at 533, the current offer attribute data 253 is received by rule generation module 160.

In one embodiment, at 535, the current user's attribute data 243 and the current offer attribute data 253 is provided as input data to one or more user interest prediction algorithms (not shown) generated by rule generation module 160 during the offline model training of rule generation module 160. In one embodiment, at 537, the one or more user interest prediction algorithms (not shown) process the current user's attribute data 243 and the current offer attribute data 253 to generate current user's interest prediction data 271 for each current offer represented in current offer data 225. In one embodiment, at 537 the current user's interest prediction data 271 for each current offer represented in current offer data 225 is correlated with the respective current offer represented in current offer data 225.

In one embodiment, at 541, the offer recommendation module 280 receives, obtains, or accesses threshold predicted current user's interest level data 273 representing a threshold predicted current user's interest level in a given current offer.

In one embodiment, at 543, the offer recommendation module 280 receives current user's interest prediction data 271. In one embodiment, at 545, the threshold predicted current user's interest level data 273 and current user's interest prediction data 271 associated with each current offer represented in current offer data 225 are compared using one or more data comparison algorithms (not shown).

In one embodiment, at 547, offer recommendation module receives current offer data 225. In one embodiment, at 549, portions of the current offer data 225 representing each current offer represented in current offer data 225 having an associated predicted current user's interest level, as indicated by the predicted current user's interest level data 273 correlated to that offer, that is greater than, or equal to, the threshold predicted current user's interest level represented by the threshold predicted current user's interest level data 273 are collected and used to generate offer recommendation data 281 representing the one or more current offers having an associated predicted current user's interest level, as indicated by the predicted current user's interest level data 273 correlated to those offers, that is greater than, or equal to, the threshold predicted current user's interest level.

In one embodiment, at 551, the offer recommendation data is provided to the current user. In one embodiment, the offer recommendation data 281 is provided to the user by offer recommendation module 280. In one embodiment, offer recommendation module 280 provides offer recommendation data 281 to the current user's computing system 291 in current user computing environment 290.

In one embodiment, at 561, the current user's actions with respect to the recommended offers of the offer recommendation data 281 is monitored by offer tracking module 285. In one embodiment, the current user's actions with respect to the recommended offers of the offer recommendation data 281 is recorded and, at 563, used to generate current offer performance data 227 for the recommended current offers.

In one embodiment, once current offer performance data 227 is generated, at 565, the current offer attribute data 253 associated with the offers of the offer recommendation data 281 is obtained by offer tracking module 285 and, at 567, the current user's data 205, and/or current user's attribute data 243 is obtained by offer tracking module 285.

In one embodiment, at 569, the current user's data 205, and/or current user's attribute data 243, the offer recommendation data 281 and/or current offer attribute data 253 associated with the offers of the offer recommendation data 281, and the current offer performance data 227 are provided back to rule generation module 160.

In one embodiment, at 571, the current user's data 205, and/or current user's attribute data 243, the offer recommendation data 281 and/or current offer attribute data 253 associated with the offers of the offer recommendation data 281, and the current offer performance data 227 are used as online training data for the one or more user interest prediction algorithms (not shown) of the offer/attribute matching model 161 of rule generation module 160.

In addition, in one embodiment, the offer recommendation data 281 and/or portions of the current offer attribute data 253 associated with the offers of the offer recommendation data 281, and the current offer performance data 227 are also incorporated in the historical offer performance model training data 127 of the historical offer database 120 for use as future model training data.

Figure 6:
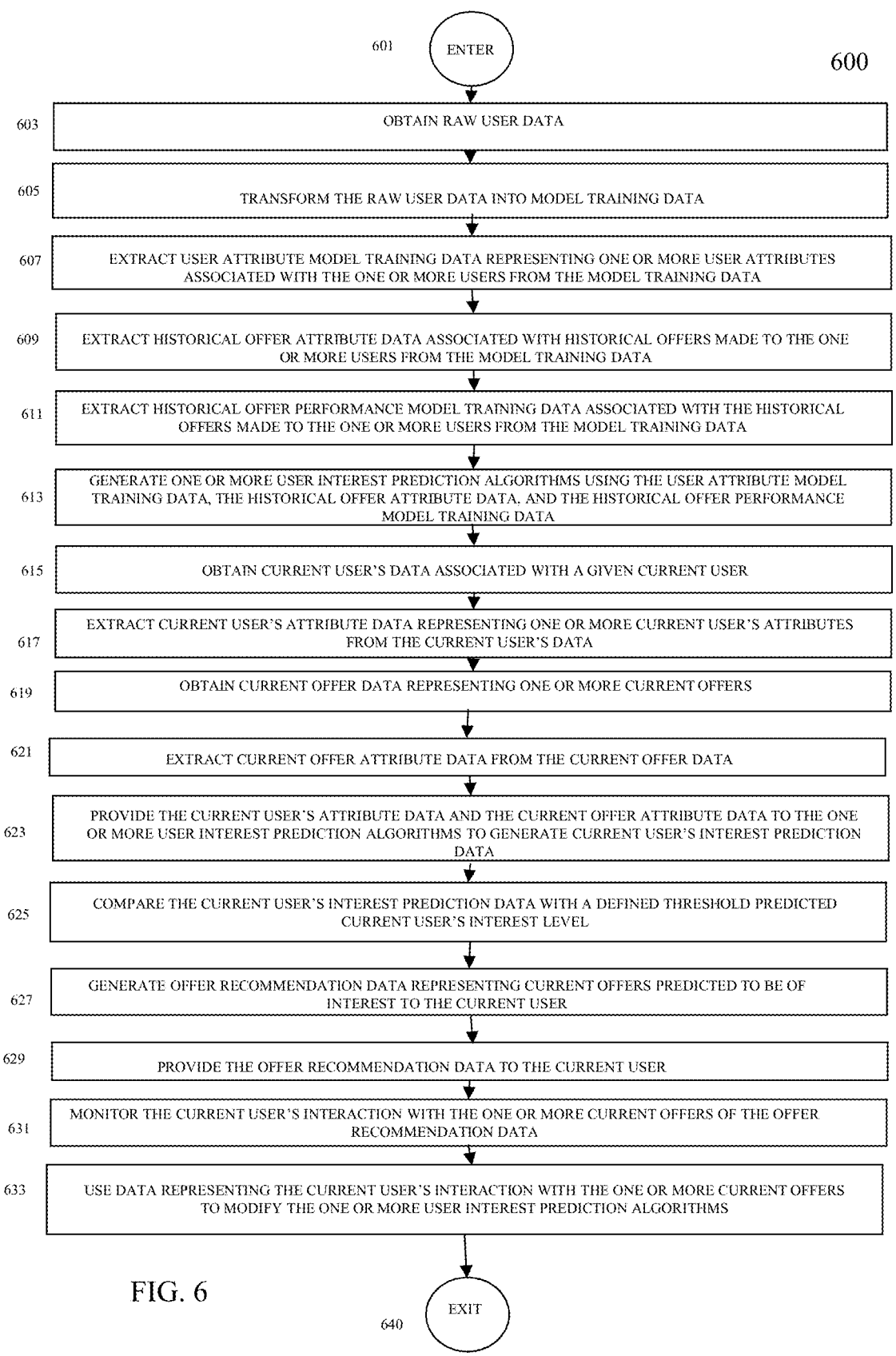
FIG. 6 is a flow diagram of a process for using machine learning techniques to identify and recommend relevant offers, in accordance with one embodiment.

FIG. 6 is a flow diagram of process 600 for using machine learning techniques to identify and recommend relevant offers, in accordance with one embodiment. As seen in FIG. 6, process 600 for using machine learning techniques to identify and recommend relevant offers begins at ENTER OPERATION 601 and proceeds to OBTAIN RAW USER DATA OPERATION 603.

In one embodiment, at OBTAIN RAW USER DATA OPERATION 603, big data analysis methods are used to access multiple sources of user data and obtain raw user data associated with two or more, and, in various embodiments, millions, tens of millions, or hundreds of millions or more, users.

In one embodiment, the user data of OBTAIN RAW USER DATA OPERATION 603 includes, but not limited to, one or more of demographic data, accounts data, clickstream data, transaction data, credit history data, historical offer data, and historical offer performance data.

In one embodiment, the raw user data of OBTAIN RAW USER DATA OPERATION 603 is obtained from one or more data management systems and is associated with two or more users/consumers of the data management systems.

In various embodiments, the two or more users/consumers of the data management systems include millions, tens of millions, or hundreds of millions or more, users/consumers.

In one embodiment, once access to the raw user data is obtained at OBTAIN RAW USER DATA OPERATION 603, process flow proceeds to TRANSFORM THE RAW USER DATA INTO MODEL TRAINING DATA OPERATION 605.

In one embodiment, at TRANSFORM THE RAW USER DATA INTO MODEL TRAINING DATA OPERATION 605 the raw user data of OBTAIN RAW USER DATA OPERATION 603 is processed and labeled to transform the raw user data into model training data.

In one embodiment the model training data of TRANSFORM THE RAW USER DATA INTO MODEL TRAINING DATA OPERATION 605 includes, but not limited to, one or more of demographic model training data, accounts model training data, clickstream model training data, transaction model training data, credit history model training data, historical offer model training data, and historical offer performance model training data, associated with the two or more users/consumers, and, in various embodiments, millions, tens of millions, or hundreds of millions or more, users/consumers and/or historical offers made to those user/consumers.

In one embodiment, once the raw user data of OBTAIN RAW USER DATA OPERATION 603 is transformed into model training data at TRANSFORM THE RAW USER DATA INTO MODEL TRAINING DATA OPERATION 605, process flow proceeds to EXTRACT USER ATTRIBUTE MODEL TRAINING DATA REPRESENTING ONE OR MORE USER ATTRIBUTES ASSOCIATED WITH THE ONE OR MORE USERS FROM THE MODEL TRAINING DATA OPERATION 607.

In one embodiment, at EXTRACT USER ATTRIBUTE MODEL TRAINING DATA REPRESENTING ONE OR MORE USER ATTRIBUTES ASSOCIATED WITH THE ONE OR MORE USERS FROM THE MODEL TRAINING DATA OPERATION 607, the model training data, including, but not limited to, the demographic model training data, accounts model training data, clickstream model training data, transaction model training data, and credit history model training data portions of the user model training data are analyzed and processed to identify user attributes in the user model training data and generate user attribute model training data associated with each of the two or more users/consumers, and, in various embodiments, the millions, tens of millions, or hundreds of millions or more, users/consumers represented in the user model training data.

In one embodiment, once the model training data is analyzed and processed to identify user attributes in the user model training data and generate user attribute model training data associated with each of the two or more users/consumers at EXTRACT USER ATTRIBUTE MODEL TRAINING DATA REPRESENTING ONE OR MORE USER ATTRIBUTES ASSOCIATED WITH THE ONE OR MORE USERS FROM THE MODEL TRAINING DATA OPERATION 607, process flow proceeds to EXTRACT HISTORICAL OFFER ATTRIBUTE DATA ASSOCIATED WITH HISTORICAL OFFERS MADE TO THE ONE OR MORE USERS FROM THE MODEL TRAINING DATA OPERATION 609.

In one embodiment, at EXTRACT HISTORICAL OFFER ATTRIBUTE DATA ASSOCIATED WITH HISTORICAL OFFERS MADE TO THE ONE OR MORE USERS FROM THE MODEL TRAINING DATA OPERATION 609, the model training data is analyzed and processed to extract historical offer attribute model training data associated with the historical offers represented in the historical offer model training data.

In one embodiment, once the model training data is analyzed and processed to extract historical offer attribute model training data associated with the historical offers represented in the historical offer model training data at EXTRACT HISTORICAL OFFER ATTRIBUTE DATA ASSOCIATED WITH HISTORICAL OFFERS MADE TO THE ONE OR MORE USERS FROM THE MODEL TRAINING DATA OPERATION 609, process flow proceeds to EXTRACT HISTORICAL OFFER PERFORMANCE MODEL TRAINING DATA ASSOCIATED WITH THE HISTORICAL OFFERS MADE TO THE ONE OR MORE USERS FROM THE MODEL TRAINING DATA OPERATION 611.

In one embodiment, at EXTRACT HISTORICAL OFFER PERFORMANCE MODEL TRAINING DATA ASSOCIATED WITH THE HISTORICAL OFFERS MADE TO THE ONE OR MORE USERS FROM THE MODEL TRAINING DATA OPERATION 611 the model training data is analyzed and processed to extract historical offer performance model training data associated with the historical offers represented in the historical offer model training data.

In one embodiment, the historical offers represented in the historical offer model training data of the model training data are correlated to the respective users represented in the user model training data to whom the historical offers were made. In one embodiment, the historical offer model training data is analyzed and processed to identify historical offer attributes and generate historical offer attribute model training data associated with the historical offers represented in the historical offer model training data. Consequently, in various embodiments, the historical offer attribute model training data includes historical offer attribute data associated with two or more historical offers and users, and, in various embodiments, millions, tens of millions, or hundreds of millions or more, historical offers and users/consumers.

In one embodiment, the historical offer attribute model training data associated with each historical offer is then correlated to the respective users represented in the user model training data to whom the historical offers were made and the user attribute model training data associated with the respective users represented in the user model training data to whom the historical offers were made. In addition, in one embodiment, the offers represented in the historical offer model training data are correlated their respective historical offer performance model training data.

Consequently, in one embodiment, historical offer attribute model training data associated with two or more historical offers, and in various embodiments, millions, tens of millions, or hundreds of millions or more, historical offers of EXTRACT HISTORICAL OFFER ATTRIBUTE DATA ASSOCIATED WITH HISTORICAL OFFERS MADE TO THE ONE OR MORE USERS FROM THE MODEL TRAINING DATA OPERATION 609, and the historical offer performance model training data associated with each of the historical offers of EXTRACT HISTORICAL OFFER PERFORMANCE MODEL TRAINING DATA ASSOCIATED WITH THE HISTORICAL OFFERS MADE TO THE ONE OR MORE USERS FROM THE MODEL TRAINING DATA OPERATION 611, is correlated to user attribute model training data associated with each of the two or more users/consumers, and, in various embodiments, the millions, tens of millions, or hundreds of millions or more, users/consumers to whom the historical offers were made of EXTRACT USER ATTRIBUTE MODEL TRAINING DATA REPRESENTING ONE OR MORE USER ATTRIBUTES ASSOCIATED WITH THE ONE OR MORE USERS FROM THE MODEL TRAINING DATA OPERATION 607.

In one embodiment, process flow then proceeds to GENERATE ONE OR MORE USER INTEREST PREDICTION ALGORITHMS USING THE USER ATTRIBUTE MODEL TRAINING DATA, THE HISTORICAL OFFER ATTRIBUTE DATA, AND THE HISTORICAL OFFER PERFORMANCE MODEL TRAINING DATA OPERATION 613.

In one embodiment, at GENERATE ONE OR MORE USER INTEREST PREDICTION ALGORITHMS USING THE USER ATTRIBUTE MODEL TRAINING DATA, THE HISTORICAL OFFER ATTRIBUTE DATA, AND THE HISTORICAL OFFER PERFORMANCE MODEL TRAINING DATA OPERATION 613 the correlated user attribute training data of EXTRACT USER ATTRIBUTE MODEL TRAINING DATA REPRESENTING ONE OR MORE USER ATTRIBUTES ASSOCIATED WITH THE ONE OR MORE USERS FROM THE MODEL TRAINING DATA OPERATION 607, the historical offer attribute training data of EXTRACT HISTORICAL OFFER ATTRIBUTE DATA ASSOCIATED WITH HISTORICAL OFFERS MADE TO THE ONE OR MORE USERS FROM THE MODEL TRAINING DATA OPERATION 609, and the historical offer performance model training of EXTRACT HISTORICAL OFFER PERFORMANCE MODEL TRAINING DATA ASSOCIATED WITH THE HISTORICAL OFFERS MADE TO THE ONE OR MORE USERS FROM THE MODEL TRAINING DATA OPERATION 611 are provided as training data for one or more offer/attribute matching models.

In one embodiment, at GENERATE ONE OR MORE USER INTEREST PREDICTION ALGORITHMS USING THE USER ATTRIBUTE MODEL TRAINING DATA, THE HISTORICAL OFFER ATTRIBUTE DATA, AND THE HISTORICAL OFFER PERFORMANCE MODEL TRAINING DATA OPERATION 613, the one or more offer/attribute matching models use the correlated user attribute training data, historical offer attribute training data, and the historical offer performance model training data in an offline training environment to generate one or more user interest prediction algorithms for matching offers to users/consumers and predicting a level of interest in an offer by a given user/consumer.

In one embodiment, once the one or more offer/attribute matching models are trained using the correlated user attribute training data, the historical offer attribute training data, and the historical offer performance model training data in an offline training environment at GENERATE ONE OR MORE USER INTEREST PREDICTION ALGORITHMS USING THE USER ATTRIBUTE MODEL TRAINING DATA, THE HISTORICAL OFFER ATTRIBUTE DATA, AND THE HISTORICAL OFFER PERFORMANCE MODEL TRAINING DATA OPERATION 613, process flow proceeds to an online environment and a runtime execution phase.

In one embodiment, runtime execution of process 600 for using machine learning techniques to identify and recommend relevant offers is performed using a given current user's data. Consequently, process flow proceeds to OBTAIN CURRENT USER'S DATA ASSOCIATED WITH A GIVEN CURRENT USER OPERATION 615.

In one embodiment, at OBTAIN CURRENT USER'S DATA ASSOCIATED WITH A GIVEN CURRENT USER OPERATION 615 a current user's data representing data associated with the specific given user is obtained from one or more sources of current user's data.

As noted above, as used herein, the terms "user" and "users" is used to denote parties whose data is obtained used as training data to train one or more user/offer attribute matching models and generate one of more user interest prediction algorithms in an offline environment. In contrast, as used herein the term "current user" is used to denote a specific individual party whose data is analyzed by the disclosed method and system for using machine learning techniques to identify and recommend relevant offers in an online runtime/execution environment and, in one embodiment, is used as online training data to train one or more user/offer attribute matching models and generate one of more user interest prediction algorithms in the online environment.

In one embodiment, the current user's data of OBTAIN CURRENT USER'S DATA ASSOCIATED WITH A GIVEN CURRENT USER OPERATION 615 includes, but is not limited to, one or more of current user's demographic data, current user's accounts data, current user's clickstream data, current user's transaction data, and current user's credit history data.

In one embodiment, once a current user's data representing data associated with the specific given user is obtained from one or more sources of current user's data at OBTAIN CURRENT USER'S DATA ASSOCIATED WITH A GIVEN CURRENT USER OPERATION 615, process flow proceeds to EXTRACT CURRENT USER'S ATTRIBUTE DATA REPRESENTING ONE OR MORE CURRENT USER'S ATTRIBUTES FROM THE CURRENT USER'S DATA OPERATION 617.

In one embodiment, at EXTRACT CURRENT USER'S ATTRIBUTE DATA REPRESENTING ONE OR MORE CURRENT USER'S ATTRIBUTES FROM THE CURRENT USER'S DATA OPERATION 617, the current user's data including, but not limited to, the current user's demographic data, the current user's accounts data, the current user's clickstream data, the current user's transaction data, and the current user's credit history data portions of the current user's data are analyzed and processed to identify current user's attributes in the current user's data and generate current user's attribute data associated with the user.

In one embodiment, once the current user's data is analyzed and processed to identify current user's attributes in the current user's data and generate current user's attribute data associated with the user at EXTRACT CURRENT USER'S ATTRIBUTE DATA REPRESENTING ONE OR MORE CURRENT USER'S ATTRIBUTES FROM THE CURRENT USER'S DATA OPERATION 617, process flow proceeds to OBTAIN CURRENT OFFER DATA REPRESENTING ONE OR MORE CURRENT OFFERS OPERATION 619.

In one embodiment, at OBTAIN CURRENT OFFER DATA REPRESENTING ONE OR MORE CURRENT OFFERS OPERATION 619, current offer data representing one or more current offers associated with one or more products is obtained, in one embodiment from one or more product and/or service providers and/or a current offer database.

As noted above, in one specific embodiment, the current offer data of OBTAIN CURRENT OFFER DATA REPRESENTING ONE OR MORE CURRENT OFFERS OPERATION 619 includes one or more financial service and product offers that are "quick action" offers related to financial services and products, such as, but not limited to, credit cards and/or lines of credit, or any other financial service or product offers, as discussed herein, and/or as known in the art at the time of filing, and/or as developed after the time of filing, that lend themselves to, or impose, a relatively short response time, or that are likely to be acted upon by the offer receiver, e.g., a current user, in a relatively short timeframe.

In one embodiment, once current offer data representing one or more current offers associated with one or more products is obtained at OBTAIN CURRENT OFFER DATA REPRESENTING ONE OR MORE CURRENT OFFERS OPERATION 619, process flow proceeds to EXTRACT CURRENT OFFER ATTRIBUTE DATA FROM THE CURRENT OFFER DATA OPERATION 621.

In one embodiment, at EXTRACT CURRENT OFFER ATTRIBUTE DATA FROM THE CURRENT OFFER DATA OPERATION 621, the current offer data of OBTAIN CURRENT OFFER DATA REPRESENTING ONE OR MORE CURRENT OFFERS OPERATION 619 is accessed and processed to identify and generate current offer attribute data representing various current offer attributes associated with each current offer represented in the current offer data.

In one embodiment, at EXTRACT CURRENT OFFER ATTRIBUTE DATA FROM THE CURRENT OFFER DATA OPERATION 621 the current offer attribute data associated with each current offer in the current offer data is correlated to the current offer.

In one embodiment, once the current offer data is accessed and processed to identify and generate current offer attribute data representing various current offer attributes associated with each current offer represented in the current offer data at EXTRACT CURRENT OFFER ATTRIBUTE DATA FROM THE CURRENT OFFER DATA OPERATION 621, process flow proceeds to PROVIDE THE CURRENT USER'S ATTRIBUTE DATA AND THE CURRENT OFFER ATTRIBUTE DATA TO THE ONE OR MORE USER INTEREST PREDICTION ALGORITHMS TO GENERATE CURRENT USER'S INTEREST PREDICTION DATA OPERATION 623.

In one embodiment, at PROVIDE THE CURRENT USER'S ATTRIBUTE DATA AND THE CURRENT OFFER ATTRIBUTE DATA TO THE ONE OR MORE USER INTEREST PREDICTION ALGORITHMS TO GENERATE CURRENT USER'S INTEREST PREDICTION DATA OPERATION 623, the current user's attribute data of EXTRACT CURRENT USER'S ATTRIBUTE DATA REPRESENTING ONE OR MORE CURRENT USER'S ATTRIBUTES FROM THE CURRENT USER'S DATA OPERATION 617 and the current offer attribute data of EXTRACT CURRENT OFFER ATTRIBUTE DATA FROM THE CURRENT OFFER DATA OPERATION 621 are provided as input data to the one or more user interest prediction algorithms of the one or more offer/attribute matching models.

In one embodiment, at PROVIDE THE CURRENT USER'S ATTRIBUTE DATA AND THE CURRENT OFFER ATTRIBUTE DATA TO THE ONE OR MORE USER INTEREST PREDICTION ALGORITHMS TO GENERATE CURRENT USER'S INTEREST PREDICTION DATA OPERATION 623, the one or more user interest prediction algorithms of the one or more offer/attribute matching models use the current user's attribute data and the current offer attribute data to generate user interest prediction data indicating the predicted interest of the user for each of the current offers in the current offer data.

In one embodiment, once the current user's attribute data and the current offer attribute data are provided as input data to the one or more user interest prediction algorithms of the one or more offer/attribute matching models to generate user interest prediction data indicating the predicted interest of the user for each of the current offers in the current offer data at PROVIDE THE CURRENT USER'S ATTRIBUTE DATA AND THE CURRENT OFFER ATTRIBUTE DATA TO THE ONE OR MORE USER INTEREST PREDICTION ALGORITHMS TO GENERATE CURRENT USER'S INTEREST PREDICTION DATA OPERATION 623, process flow proceeds to COMPARE THE CURRENT USER'S INTEREST PREDICTION DATA WITH A DEFINED THRESHOLD PREDICTED CURRENT USER'S INTEREST LEVEL OPERATION 625.

In one embodiment, at COMPARE THE CURRENT USER'S INTEREST PREDICTION DATA WITH A DEFINED THRESHOLD PREDICTED CURRENT USER'S INTEREST LEVEL OPERATION 625, a predicted interest level of the user with respect to each of current offers in the current offer data is compared to a defined threshold current user's interest level.

In one embodiment, at COMPARE THE CURRENT USER'S INTEREST PREDICTION DATA WITH A DEFINED THRESHOLD PREDICTED CURRENT USER'S INTEREST LEVEL OPERATION 625 a threshold current user's interest level is defined and threshold current user's interest level data is generated representing the defined threshold current user's interest level.

In one embodiment, at COMPARE THE CURRENT USER'S INTEREST PREDICTION DATA WITH A DEFINED THRESHOLD PREDICTED CURRENT USER'S INTEREST LEVEL OPERATION 625 for each offer represented in the current offer data of OBTAIN CURRENT OFFER DATA REPRESENTING ONE OR MORE CURRENT OFFERS OPERATION 619, the predicted interest level of the user with respect to that offer represented by the user interest prediction data associated with that offer of PROVIDE THE CURRENT USER'S ATTRIBUTE DATA AND THE CURRENT OFFER ATTRIBUTE DATA TO THE ONE OR MORE USER INTEREST PREDICTION ALGORITHMS TO GENERATE CURRENT USER'S INTEREST PREDICTION DATA OPERATION 623 is compared with the threshold current user's interest level indicated by the threshold current user's interest level data.

In one embodiment, at COMPARE THE CURRENT USER'S INTEREST PREDICTION DATA WITH A DEFINED THRESHOLD PREDICTED CURRENT USER'S INTEREST LEVEL OPERATION 625 the portion of current offer data representing current offers having at least the threshold current user's interest level, as indicated in the user interest prediction data for the current offers, is obtained.

In one embodiment, process flow then proceeds to GENERATE OFFER RECOMMENDATION DATA REPRESENTING CURRENT OFFERS PREDICTED TO BE OF INTEREST TO THE CURRENT USER OPERATION 627.

In one embodiment, at GENERATE OFFER RECOMMENDATION DATA REPRESENTING CURRENT OFFERS PREDICTED TO BE OF INTEREST TO THE CURRENT USER OPERATION 627 the portion of current offer data representing current offers having a threshold current user's interest level, as indicated in the user interest prediction data for that current offer obtained at COMPARE THE CURRENT USER'S INTEREST PREDICTION DATA WITH A DEFINED THRESHOLD PREDICTED CURRENT USER'S INTEREST LEVEL OPERATION 625 is transformed into offer recommendation data that includes the current offer data representing one or more current offers having a threshold current user's interest level.

In one embodiment, once the portion of current offer data representing current offers having a threshold current user's interest level, as indicated in the user interest prediction data for that current offer is transformed into offer recommendation data that includes the current offer data representing one or more current offers having a threshold current user's interest level at GENERATE OFFER RECOMMENDATION DATA REPRESENTING CURRENT OFFERS PREDICTED TO BE OF INTEREST TO THE CURRENT USER OPERATION 627, process flow proceeds to PROVIDE THE OFFER RECOMMENDATION DATA TO THE CURRENT USER OPERATION 629.

In one embodiment, at PROVIDE THE OFFER RECOMMENDATION DATA TO THE CURRENT USER OPERATION 629 the offer recommendation data is provided to the current user.

In one embodiment, the offer recommendation data of PROVIDE THE OFFER RECOMMENDATION DATA TO THE CURRENT USER OPERATION 629 includes a listing of recommended current offers and the recommended current offers are ranked in the offer recommendation data according to various factors including, but not limited to, the weighted or non-weighted matching level of the user and offer attributes, and/or any other indicated parameters.

In one embodiment, the offer recommendation data of PROVIDE THE OFFER RECOMMENDATION DATA TO THE CURRENT USER OPERATION 629 includes the analysis parameters, features, assumptions, and/or processes used to perform the ranking of the recommended offers, including the predicted level of interest data, is included in the offer recommendation data provided to the current user.

In one embodiment, the offer recommendation data of PROVIDE THE OFFER RECOMMENDATION DATA TO THE CURRENT USER OPERATION 629 includes a score or ranking indicating the likelihood of the current user successfully obtaining the product or service that is the subject of the recommended offers and, in one embodiment, key factors and considerations used in the calculations.

In one embodiment, once the offer recommendation data is provided to the current user at PROVIDE THE OFFER RECOMMENDATION DATA TO THE CURRENT USER OPERATION 629, process flow proceeds to MONITOR THE CURRENT USER'S INTERACTION WITH THE ONE OR MORE CURRENT OFFERS OF THE OFFER RECOMMENDATION DATA OPERATION 631.

In one embodiment, at MONITOR THE CURRENT USER'S INTERACTION WITH THE ONE OR MORE CURRENT OFFERS OF THE OFFER RECOMMENDATION DATA OPERATION 631 the current user's actions with respect to the recommended offers of the recommended offer data of PROVIDE THE OFFER RECOMMENDATION DATA TO THE CURRENT USER OPERATION 629 are monitored and recorded as current offer performance data.

In one embodiment, at MONITOR THE CURRENT USER'S INTERACTION WITH THE ONE OR MORE CURRENT OFFERS OF THE OFFER RECOMMENDATION DATA OPERATION 631, the current user's actions with respect to the recommended offers is recorded and used to generate current offer performance data.

In one embodiment, once current offer performance data is generated at MONITOR THE CURRENT USER'S INTERACTION WITH THE ONE OR MORE CURRENT OFFERS OF THE OFFER RECOMMENDATION DATA OPERATION 631, process flow proceeds to USE DATA REPRESENTING THE CURRENT USER'S INTERACTION WITH THE ONE OR MORE CURRENT OFFERS TO MODIFY THE ONE OR MORE USER INTEREST PREDICTION ALGORITHMS OPERATION 633.

In one embodiment, at USE DATA REPRESENTING THE CURRENT USER'S INTERACTION WITH THE ONE OR MORE CURRENT OFFERS TO MODIFY THE ONE OR MORE USER INTEREST PREDICTION ALGORITHMS OPERATION 633, the current user's data, and/or current user's attribute data, the recommended offer data of EXTRACT CURRENT USER'S ATTRIBUTE DATA REPRESENTING ONE OR MORE CURRENT USER'S ATTRIBUTES FROM THE CURRENT USER'S DATA OPERATION 617, and/or current offer attribute data of EXTRACT CURRENT OFFER ATTRIBUTE DATA FROM THE CURRENT OFFER DATA OPERATION 621 associated with the offers of the recommended offer data of GENERATE OFFER RECOMMENDATION DATA REPRESENTING CURRENT OFFERS PREDICTED TO BE OF INTEREST TO THE CURRENT USER OPERATION 627, and the current offer performance data of MONITOR THE CURRENT USER'S INTERACTION WITH THE ONE OR MORE CURRENT OFFERS OF THE OFFER RECOMMENDATION DATA OPERATION 631, are provided as online training data for the one or more user interest prediction algorithms of PROVIDE THE CURRENT USER'S ATTRIBUTE DATA AND THE CURRENT OFFER ATTRIBUTE DATA TO THE ONE OR MORE USER INTEREST PREDICTION ALGORITHMS TO GENERATE CURRENT USER'S INTEREST PREDICTION DATA OPERATION 623.

In addition, in one embodiment, at USE DATA REPRESENTING THE CURRENT USER'S INTERACTION WITH THE ONE OR MORE CURRENT OFFERS TO MODIFY THE ONE OR MORE USER INTEREST PREDICTION ALGORITHMS OPERATION 633 the recommended offer data of GENERATE OFFER RECOMMENDATION DATA REPRESENTING CURRENT OFFERS PREDICTED TO BE OF INTEREST TO THE CURRENT USER OPERATION 627, and/or current offer attribute data of EXTRACT CURRENT OFFER ATTRIBUTE DATA FROM THE CURRENT OFFER DATA OPERATION 621 associated with the offers of the recommended offer data of GENERATE OFFER RECOMMENDATION DATA REPRESENTING CURRENT OFFERS PREDICTED TO BE OF INTEREST TO THE CURRENT USER OPERATION 627, and the current offer performance data of MONITOR THE CURRENT USER'S INTERACTION WITH THE ONE OR MORE CURRENT OFFERS OF THE OFFER RECOMMENDATION DATA OPERATION 631, are also incorporated in the historical offer performance model training data of the historical offer database for use as future model training data.

As noted above, in one specific embodiment, the current offer data of OBTAIN CURRENT OFFER DATA REPRESENTING ONE OR MORE CURRENT OFFERS OPERATION 619 includes one or more financial service and product offers that are "quick action" offers related to financial services and products, such as, but not limited to, credit cards and/or lines of credit, or any other financial service or product offers, as discussed herein, and/or as known in the art at the time of filing, and/or as developed after the time of filing, that lend themselves to, or impose, a relatively short response time, or that are likely to be acted upon by the offer receiver in a relatively short timeframe.

As also noted above, in many cases, the offer receiver's response or interaction with the quick action offers are not only conducted within a relatively short time of the offer being made, but the current user's acceptance of the offer, and the offer provider's acceptance of the current user's acceptance of the offer, i.e., the performance of the offer, can be monitored and determined in a relatively short timeframe. This, in turn, allows for relative real-time re-training and automatic adjustment of the one or more user interest prediction algorithms of PROVIDE THE CURRENT USER'S ATTRIBUTE DATA AND THE CURRENT OFFER ATTRIBUTE DATA TO THE ONE OR MORE USER INTEREST PREDICTION ALGORITHMS TO GENERATE CURRENT USER'S INTEREST PREDICTION DATA OPERATION 623 at USE DATA REPRESENTING THE CURRENT USER'S INTERACTION WITH THE ONE OR MORE CURRENT OFFERS TO MODIFY THE ONE OR MORE USER INTEREST PREDICTION ALGORITHMS OPERATION 633 to adapt to changes in the real world operating environment.

In one embodiment, once the current user's data, and/or current user's attribute data, the recommended offer data, and/or current offer attribute data associated with the offers of the recommended offer data, and/or the current offer performance data are provided as online training data for the one or more user interest prediction algorithms at USE DATA REPRESENTING THE CURRENT USER'S INTERACTION WITH THE ONE OR MORE CURRENT OFFERS TO MODIFY THE ONE OR MORE USER INTEREST PREDICTION ALGORITHMS OPERATION 633, process flow proceeds to EXIT OPERATION 640.

In one embodiment, at EXIT OPERATION 640, process 600 for using machine learning techniques to identify and recommend relevant offers is exited to await new data.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "obtaining," "training," "extracting," "executing," "mapping," "modifying," "analyzing," "providing," "enforcing," "monitoring," "generating," "defining," "determining," "calculating," "transforming," "correlating," "normalizing," "accessing," "analyzing," "obtaining," "identifying," "associating," "aggregating," "initiating," "collecting," "creating," "transferring," "storing," "searching," "comparing," "providing," "processing" etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes by a computer program stored via a computer program product as defined herein that can be accessed by a computing system or other device to transform the computing system or other device into a specifically and specially programmed computing system or another device.

Those of skill in the art will readily recognize that the algorithms and operations presented herein are not inherently related to any particular computing system, computer architecture, computer or industry standard, or any other specific apparatus. It may prove convenient/efficient to construct or transform one or more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity, and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s are identified using a particular nomenclature for ease of description and understanding, but other nomenclature is often used in the art to identify equivalent operations.

In the discussion above, certain aspects of one embodiment include process steps and/or operations and/or instructions described herein for illustrative purposes in a particular order and/or grouping. However, the particular order and/or grouping shown and discussed herein is illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein does not limit the scope of the invention as claimed below.

Therefore, numerous variations, whether explicitly provided for by the specification or implied by the specification or not, may be implemented by one of skill in the art in view of this disclosure.

What is claimed is:

1. A method performed by one or more processors of a system for using machine learning techniques to generate recommended offers, the method comprising:
   providing a user feature engineering module including a user attribute data extraction engine;
   providing an offer feature engineering module including an offer attribute and performance data extraction engine;
   providing an offer management module including an offer attribute extraction engine;
   providing a rule generation module including one or more attribute matching models;
   obtaining historical data associated with a number of system users of the system, the historical data including at least one of demographic data or clickstream data associated with the number of system users, the historical data further including historical offer data and historical offer performance data associated with one or more historical offers made to the number of system users;
   transforming the historical data into model training data including at least one of demographic model training data or clickstream model training data for the number of system users, the model training data further including historical offer model training data and historical offer performance model training data associated with the one or more historical offers made to the number of system users;
   providing at least one of the demographic model training data or the clickstream model training data to the user attribute data extraction engine of the user feature engineering module;
   generating, based on the user attribute data extraction engine processing the at least one demographic model training data or clickstream model training data, user attribute model training data representing one or more user attributes associated with each of the number of system users;
   providing the historical offer model training data and historical offer performance model training data to the offer attribute and performance data extraction engine of the offer feature engineering module;
   generating, based on the offer attribute and performance data extraction engine processing the historical offer model training data and historical offer performance model training data, historical offer attribute model training data representing one or more historical offer attributes associated with each of the one or more historical offers;
   for each respective system user of the number of system users and each of the one or more historical offers, correlating the user attributes associated with the respective system user with the one or more historical offer attributes and historical offer performance model training data associated with each historical offer of the one or more historical offers made to the respective system user;
   generating, based on the correlating, correlated training data including user attribute model training data, historical offer attribute model training data, and historical offer performance model training data;
   training the one or more attribute matching models to predict user interest in an offer based at least in part on the correlated training data and one or more user interest prediction algorithms;
   obtaining current user's data associated with a given current user, the current user's data including at least one of the given current user's demographic data or the given current user's clickstream data;
   providing at least a portion of the current user's data to the user attribute data extraction engine of the user feature engineering module;

generating, based on the user attribute data extraction engine processing the at least portion of the current user's data, current user's attribute data representing one or more current user's attributes associated with the given current user;

providing a current offer attribute data extraction module including a current offer attribute data extraction engine;

obtaining current offer attribute data representing attributes of one or more current offers;

providing the current offer data to the current offer attribute data extraction engine of the current offer attribute data extraction module;

generating, based on the current offer attribute data extraction engine processing the current offer data, current offer attribute data representing one or more current offer attributes associated with the one or more current offers;

providing the current user's attribute data and the current offer attribute data to the trained one or more user interest prediction algorithms of the one or more attribute matching models;

generating, with the trained one or more user interest prediction algorithms, current user's interest prediction data representing, for each respective offer of the one or more current offers, a predicted interest level for the given current user, the predicted interest level indicating a predicted level of interest that the given current user has in the respective offer;

correlating the current user's interest prediction data for each of the one or more current offers represented in the current offer data to the respective offer of the one or more current offers to which the current user's interest prediction data applies;

defining a threshold interest level and generating threshold predicted current user's interest level data representing the defined threshold interest level;

for each respective offer of the one or more current offers, comparing the predicted interest level corresponding to the respective offer with the defined threshold interest level;

generating offer recommendation data representing one or more current offers recommended for the given current user based on collecting portions of the current offer data associated with the current offers of the one or more current offers having an associated predicted interest level greater than the defined threshold interest level;

generating one or more recommended offers for the given current user based on the offer recommendation data; and providing the one or more recommended offers to the given current user.

2. The method of claim 1, further comprising:

monitoring the given current user's interaction with the one or more current offers;

generating current offer performance data for each of the one or more current offers;

providing the current user's attribute data, the current offer attribute data for each of the one or more current offers represented in the offer recommendation data, and current offer performance data for each of the one or more current offers represented in the offer recommendation data to the one or more attribute matching models as online model training data; and modifying, based on the one or more attribute matching models processing the current user's attribute data, the current offer attribute data for each of the one or more current offers represented in the offer recommendation data, and current offer performance data for each of the one or more current offers represented in the offer recommendation data, the one or more user interest prediction algorithms.

3. The method of claim 1, wherein the number of system users includes at least one of hundreds of system users, thousands of system users, tens of thousands of system users, hundreds of thousands of system users, millions of system users, tens of millions of system users, hundreds of millions of system users, or more than hundreds of millions of system users.

4. A system comprising:

one or more processors; and at least one memory coupled to the one or more processors and storing instructions that, when executed by the one or more processors, cause the system to perform operations including:

providing a user feature engineering module including a user attribute data extraction engine;

providing an offer feature engineering module including an offer attribute and performance data extraction engine;

providing an offer management module including an offer attribute extraction engine;

providing a rule generation module including one or more attribute matching models;

obtaining historical data associated with a number of system users of the system, the historical data including at least one of demographic data or clickstream data associated with the number of system users, the historical data further including historical offer data and historical offer performance data associated with one or more historical offers made to the number of system users;

transforming the historical data into model training data including at least one of demographic model training data or clickstream model training data for the number of system users, the model training data further including historical offer model training data and historical offer performance model training data associated with the one or more historical offers made to the number of system users;

providing at least one of the demographic model training data or the clickstream model training data to the user attribute data extraction engine of the user feature engineering module;

generating, based on the user attribute data extraction engine processing the at least one demographic model training data or clickstream model training data, user attribute model training data representing one or more user attributes associated with each of the number of system users;

providing the historical offer model training data and historical offer performance model training data to the offer attribute and performance data extraction engine of the offer feature engineering module;

generating, based on the offer attribute and performance data extraction engine processing the historical offer model training data and historical offer performance model training data, historical offer attribute model training data representing one or more historical offer attributes associated with each of the one or more historical offers;

for each respective system user of the number of system users and each of the one or more historical offers, correlating the user attributes associated with the respective system user with the one or more historical offer attributes and historical offer performance model training data associated with each historical offer of the one or more historical offers made to the respective system user;

generating, based on the correlating, correlated training data including user attribute model training data, historical offer attribute model training data, and historical offer performance model training data;

training the one or more attribute matching models to predict user interest in an offer based at least in part on the correlated training data and one or more user interest prediction algorithms;

obtaining current user's data associated with a given current user, the current user's data including at least one of the given current user's demographic data or the given current user's clickstream data;

providing at least a portion of the current user's data to the user attribute data extraction engine of the user feature engineering module;

generating, based on the user attribute data extraction engine processing the at least portion of the current user's data, current user's attribute data representing one or more current user's attributes associated with the given current user;

providing a current offer attribute data extraction module including a current offer attribute data extraction engine;

obtaining current offer attribute data representing attributes of one or more current offers;

providing the current offer data to the current offer attribute data extraction engine of the current offer attribute data extraction module;

generating, based on the current offer attribute data extraction engine processing the current offer data, current offer attribute data representing one or more current offer attributes associated with the one or more current offers;

providing the current user's attribute data and the current offer attribute data to the trained one or more user interest prediction algorithms of the one or more attribute matching models;

generating, with the trained one or more user interest prediction algorithms, current user's interest prediction data representing, for each respective offer of the one or more current offers, a predicted interest level for the given current user, the predicted interest level indicating a predicted level of interest that the given current user has in the respective offer;

correlating the current user's interest prediction data for each of the one or more current offers represented in the current offer data to the respective offer of the one or more current offers to which the current user's interest prediction data applies;

defining a threshold interest level and generating threshold predicted current user's interest level data representing the defined threshold interest level;

for each respective offer of the one or more current offers, comparing the predicted interest level corresponding to the respective offer with the defined threshold interest level;

generating offer recommendation data representing one or more current offers recommended for the given current user based on collecting portions of the current offer data associated with the current offers of the one or more current offers having an associated predicted interest level greater than the defined threshold interest level;

generating one or more recommended offers for the given current user based on the offer recommendation data; and providing the one or more recommended offers to the given current user.

5. The system of claim 4, wherein execution of the instructions causes the system to perform operations further including:

monitoring the given current user's interaction with the one or more current offers;

generating current offer performance data for each of the one or more current offers;

providing the current user's attribute data, the current offer attribute data for each of the one or more current offers represented in the offer recommendation data, and current offer performance data for each of the one or more current offers represented in the offer recommendation data to the one or more attribute matching models as online model training data; and modifying, based on the one or more attribute matching models processing the current user's attribute data, the current offer attribute data for each of the one or more current offers represented in the offer recommendation data, and current offer performance data for each of the one or more current offers represented in the offer recommendation data, the one or more user interest prediction algorithms.

6. The system of claim 4, wherein the number of system users includes at least one of hundreds of system users, thousands of system users, tens of thousands of system users, hundreds of thousands of system users, millions of system users, tens of millions of system users, hundreds of millions of system users, or more than hundreds of millions of system users.

* * * * *